(12) United States Patent
Waidhofer

(10) Patent No.: US 11,748,259 B2
(45) Date of Patent: Sep. 5, 2023

(54) SYSTEM AND METHOD TO CONSERVE DEVICE LIFETIME FOR SNAPSHOT GENERATION

(71) Applicant: Dell Products L.P., Round Rock, TX (US)

(72) Inventor: Gordon William Waidhofer, Irvine, CA (US)

(73) Assignee: Dell Products L.P., Round Rock, TX (US)

( * ) Notice: Subject to any disclaimer, the term of this patent is extended or adjusted under 35 U.S.C. 154(b) by 125 days.

(21) Appl. No.: 17/497,918

(22) Filed: Oct. 9, 2021

(65) Prior Publication Data

US 2023/0112221 A1 Apr. 13, 2023

(51) Int. Cl.
*G06F 16/00* (2019.01)
*G06F 12/02* (2006.01)
*G06F 11/14* (2006.01)

(52) U.S. Cl.
CPC ...... *G06F 12/0253* (2013.01); *G06F 11/1458* (2013.01); *G06F 2201/84* (2013.01); *G06F 2212/7205* (2013.01)

(58) Field of Classification Search
CPC ............. G06F 12/0253; G06F 11/1458; G06F 2201/84; G96F 2212/7205
USPC .......................................................... 707/649
See application file for complete search history.

(56) References Cited

U.S. PATENT DOCUMENTS

| | | | |
|---|---|---|---|
| 7,676,514 B2 * | 3/2010 | Faibish | G06F 3/061 707/649 |
| 8,458,417 B2 * | 6/2013 | Goss | G06F 12/0246 711/170 |
| 8,612,719 B2 | 12/2013 | Givargis et al. | |
| 2018/0260319 A1 * | 9/2018 | Thompson | G06F 12/0246 |
| 2019/0227925 A1 * | 7/2019 | Hsu | G06F 3/0652 |

* cited by examiner

*Primary Examiner* — Monica M Pyo
(74) *Attorney, Agent, or Firm* — Womble Bond Dickinson (US) LLP

(57) ABSTRACT

Methods and systems for generating backups are disclosed. To generate a backup, a snapshot may be generated. A snapshot may be a point in time representation of data, in contrast to live data which may be updated over time. To reduce the impact of snapshot generation, a method, system, and device for generating and maintaining a snapshot that utilizes fewer writes is disclosed. To reduce the writes, the snapshots may be generated by preferentially referring to already stored copies of data for the snapshot rather than storing an additional copy of data for the snapshot. The snapshots may be maintained by storing copies of data for the snapshot only when live data diverges from the snapshot.

20 Claims, 18 Drawing Sheets

SYSTEM AND METHOD TO CONSERVE DEVICE LIFETIME FOR SNAPSHOT GENERATION

FIELD

Embodiments disclosed herein relate generally to snapshots. More particularly, embodiments disclosed herein relate to systems and methods to manage snapshot storage in devices.

BACKGROUND

Computing devices may store data and use stored data. For example, computing devices may utilize and generate data when providing computer implemented services. Having access to the data in the future may allow various types of computer implemented services to be provided. Some type of computer implemented services may not be able to be provided when the data is not accessible.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
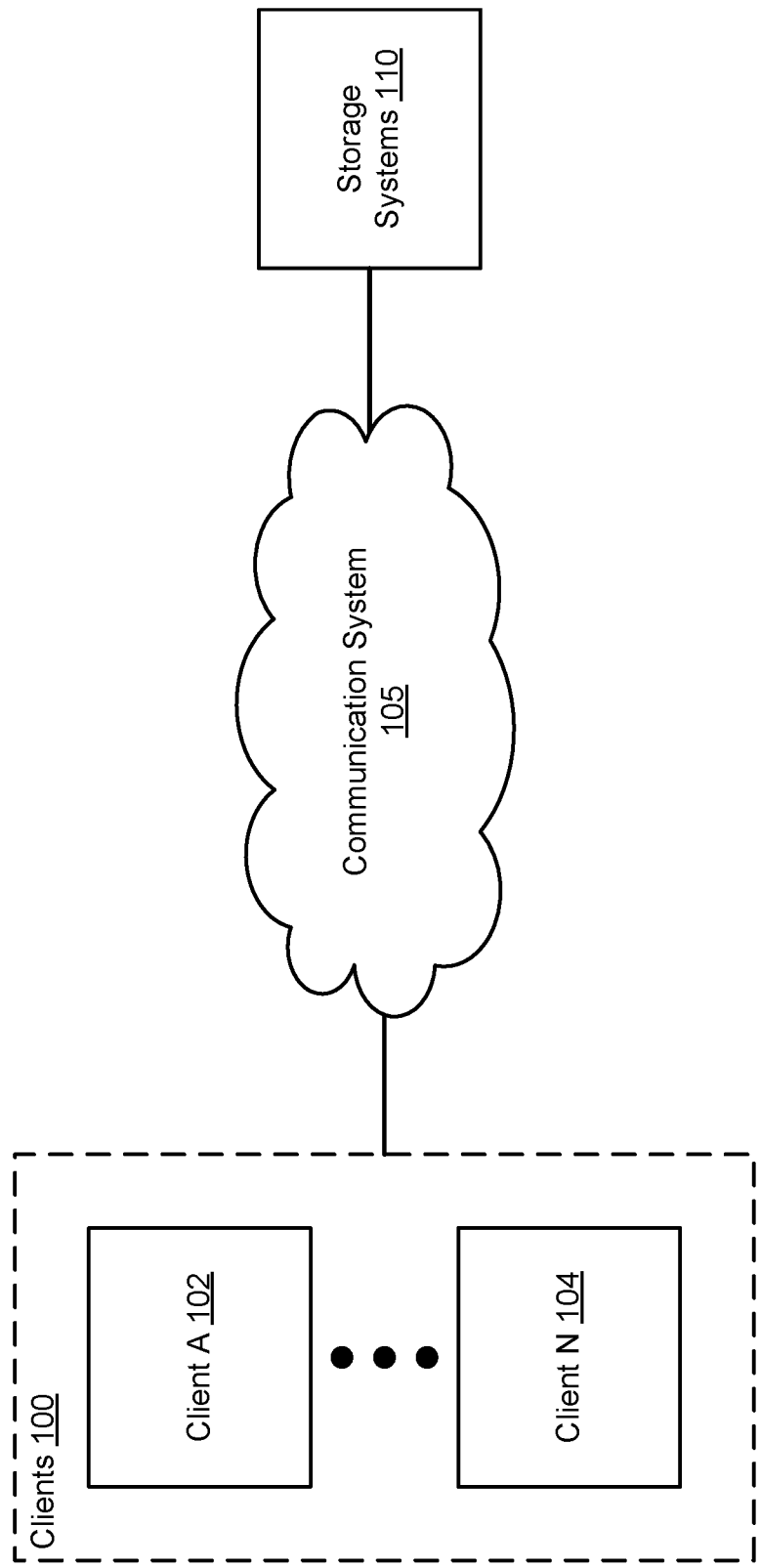
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for generating backups. To generate a backup, a snapshot may be generated. The snapshot may be generated for other purposes without departing from embodiments disclosed herein. A snapshot may be a point in time representation of data. The backup may be generated with the snapshot by, for example, identifying blocks in which data is stored that are not protected by backups. The backups may be generated to put in place protection for these blocks without limiting the operation of a device while the backup is being generated.

To reduce the impact of snapshot generation, embodiments disclosed herein may provide a method, system, and device for generating and maintaining a snapshot that utilizes fewer writes. To reduce the writes, the snapshots may be generated by preferentially referring to already stored copies of data for the snapshot rather than storing an additional copy of data for the snapshot. The snapshots may be maintained by storing copies of data for the snapshot only when live data diverges from the snapshot. In this manner, fewer write may be employed to both generate and maintain a snapshot when compared to storing a copy of data for a snapshot.

By reducing the number of writes, the impact of snapshot generation on write-limited storage devices may be greatly reduced. Consequently, the operational life of such devices may be extended while still being afforded the benefits of backup generation.

For example, when a client or other type of computing devices operates, the client device may rely on access to data for its operation. If the data becomes in accessible, the client may not be able to provide desired computer implemented services. By generating backups, access to the data may be restored with the backups thereby allowing the client to continue to provide computer implemented services even when access to data is lost due to, for example, data corruption, device failure, etc.

In this manner, an embodiment disclosed herein may provide a computing device with a longer operational life, a greater data storage capacity (e.g., by virtue of consuming fewer storage resources for snapshot storage/maintenance), improved performance (e.g., by reducing data storage operations for snapshot generation/maintenance), and/or other benefits. In particular, the improved performance of the computing device may reduce the cognitive burden on users of computing devices by avoiding phantom slowdowns or other processes due to management functions such as backup generation that are not clearly linked to computer implemented services consumed by users during the user experience.

In an embodiment, a computer-implemented method for operating a client is provided. The computer-implemented method includes selecting a first storage block of a storage device for garbage collection; based on the selection of the first storage block, garbage collecting the first storage block by: making a first determination that a first portion of the first storage block is referenced by a data map, the data map comprising references usable to retrieve first data associated with a current point in time; in response to the first determination: storing a copy of a portion of the data from the first portion of the first storage block in a first portion of a second storage block of the storage device, and updating the data map based on the first portion of the second storage block, the updated data map indicating that the first portion of the first storage block does not store any first data; making a second determination that a second portion of the first storage block is referenced by a data snapshot map, the data snapshot map comprising references usable to retrieve second data associated with a past point in time; and in response to the second determination: storing a copy of a portion of the second data from the second portion of the first storage block in a first portion of a third storage block of the storage device, and updating the data snapshot map based on the first portion of the third storage block, the updated data snapshot map indicating that the second portion of the first storage block does not store any second data.

Updating the data map includes obtaining address information for the first portion of the second storage block; identifying an entry of the data map that specifies: an identifier for the portion of the first data, and address information for the first portion of the first storage block; and replacing, in the entry of the data map, the address information for the first portion of the first storage block with the address information for the first portion of the second storage block.

Storing the copy of the portion of the first data from the first portion of the first storage block in the first portion of the second storage block of the storage device includes writing the copy of the portion of the first data to the first portion of the second storage block using the address information for the first portion of the second storage block; and updating metadata associated with first portion of the second storage block to reference the entry.

Updating the data snapshot map includes obtaining address information for the first portion of the third storage block; identifying an entry of the data snapshot map that specifies:

an identifier for the portion of the second data, and a reference to the entry of the data map; and replacing, in the entry of the data snapshot map, the reference to the entry of the data map with the address information for the first portion of the third storage block.

Updating the data snapshot map includes obtaining address information for the first portion of the third storage block; identifying an entry of the data snapshot map that specifies: an identifier for the portion of the second data, and address information for the second portion of the first storage block; and replacing, in the entry of the data snapshot map, the address information for the second portion of the first storage block with the address information for the first portion of the third storage block.

The computer implemented method may also include releasing the first storage block in response to completing the garbage collection of the first storage block.

The storage device may include a media that does not include write in place functionality.

The storage device performs garbage collection to remove dead data, wherein the garbage collection copies forward live data from garbage collected blocks and releases the garbage collected blocks.

The storage device is write limited by virtue of wear on the media used to store data in the storage device. For example, the media may have a limited number of write cycles after which the media may fail.

A non-transitory media may include instructions that when executed by a processor cause the computer-implemented method to be performed.

A data processing system may include the non-transitory media and a processor, and may perform the computer-implemented method when the computer instructions are executed by the process.

Turning to FIG. 1, a block diagram illustrating a system in accordance with an embodiment is shown. The system shown in FIG. 1 may provide computer implemented services. The system may include, but is not limited to, one or more clients 100 communicatively coupled to one or more storage systems 110. Each of these components is discussed below.

All, or a portion, of clients 102-104 may provide computer implemented services to users and/or other computing devices operably connected to clients 100. The computer implemented services may include any type and quantity of services including, for example, database services, instant messaging services, video conferencing services, etc. To provide these services, clients 100 may host applications that provide these (and/or other) computer implemented services. When the computer implemented services are provided, data may be generated and stored in clients 100. The data may correspond to any type and quantity of data. Future operation of clients 100 may be tied to access to the data.

For example, consider a scenario where a client is hosting a database. Various portions of data may be stored in the database over time. If the data structures in which the database is stored in physical storage media become inaccessible (e.g., due to data corruption, data loss, unintended deletions/rewrites, intended deletions/rewrites, physical storage media failure, etc.), then all, or a portion, of services using the database may not be able to be provided in the future.

In an embodiment, backups of clients 100 are generated to reduce the risk of data of clients 100 becoming permanently inaccessible. A backup may be a data structure usable to restore all, or a portion, of a data of a client to a corresponding previous point in time. For example, a backup may reflect the state of data of a client at a point in time, may reflect changes to data of client between two points in time, and/or may include other information regarding data of the client usable to gain access to data of a client after the data has become inaccessible. After data of a client becomes inaccessible, one or more backups may be utilized to restore access to the data thereby allowing for computer implemented services to be provided even when data for the computer implemented services has been rendered inaccessible. Any number of backups may be used in isolation or in conjunction with other backups to restore access to data of a client.

In an embodiment, the backups are stored in storage system 110. Storage systems 110 may be in a different fault domain from clients 100 (or may be in the same fault domain). Storage systems 110 may store copies of the backups and provides copies of the backups for restoration purposes in an embodiment. The backups may also be used, for example, to instantiate copies of data corresponding to previous points in time of clients 100 on other devices.

In an embodiment, the backups are generated using snapshots. A snapshot may be a representation of data of a client at a point in time. Once a snapshot is instantiated, the current data of a client (e.g., live data) may begin to diverge from the snapshot as the client generates and stores new data. To provide access to a snapshot, a complete copy of the data of the client at the point in time may be maintained. In an embodiment, all, or a portion, of the complete copy of the data is maintained by referencing portions of live data that are duplicative of corresponding portions of the snapshot. Thus, only a single copy of various portions of the live data and snapshot that are duplicative may be stored.

In general, embodiments disclosed herein relate to methods, system, and devices for maintaining snapshots usable for backup generation purposes. The disclosed methods, systems, and devices may maintain snapshots in a manner that reduces the impact such maintenance has on device lifetimes. By doing so, a client (and/or components of the client) in accordance with embodiments disclosed herein may have an improved operational lifetime.

In an embodiment, a client maintains snapshots by limiting the number of writes used to maintain the snapshots. To do so, rather than storing a copy of current data at the point in time for the snapshot, the client may only store copies of data corresponding to the snapshot when the current data of the client diverges from the snapshot (e.g., due to a rewrite, a deletion, etc.). By doing so, the total number of storage media writes may be reduced thereby reducing wear on storage media.

Clients 102-104 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 5. For additional details regarding clients 100, refer to FIG. 2A.

In an embodiment, communication system 105 includes one or more networks that facilitate communication between clients 100 and storage systems 110. The networks may include wired networks and/or wireless networks (e.g., and/or the Internet). The networks may operate in accordance with any number and types of communication protocols (e.g., such as the internet protocol). In an embodiment, one or more of storage systems 110 are directly connected to one or more of clients 110.

Storage systems 110 may be implemented with a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 5.

While illustrated in FIG. 1 as included a limited number of specific components, a system in accordance with an embodiment may include fewer, additional, and/or different components than those illustrated therein.

Figure 2A:
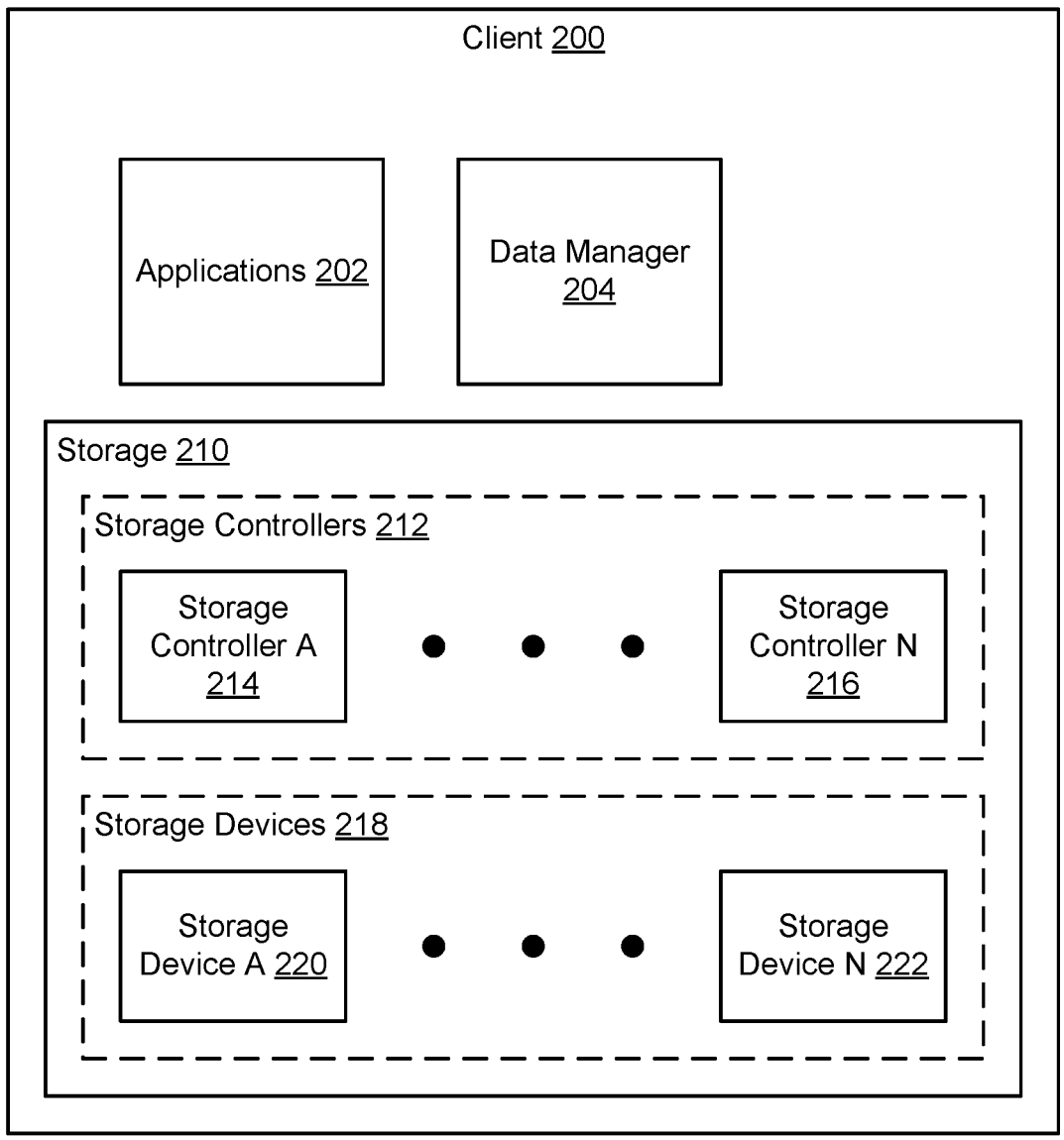
FIG. 2A shows a block diagram illustrating a client in accordance with an embodiment.

Turning to FIG. 2A, a diagram of an example client 200 in accordance with an embodiment is shown. Client 200 may be similar to any of clients 100.

Client 200 may (i) provide computer implemented services, (ii) store data for the computer implemented services, (iii) generate backups, (iv) store the backups in storage system, and (v) use the backups to restore inaccessible data to improve the likelihood of being able to provide the computer implemented services. When generating the backups, client 200 may store a snapshot (e.g., which may be instantiated by client 200). The snapshot may reflect the data of client 200 at a point in time and may be usable to generate the backup.

To provide the above noted functionality (and/or other functionalities), client 200 may include applications 202, data manager 204, and storage 210. Each of these components is discussed below.

Applications 202 may provide the computer implemented services. When doing so, applications 202 may store data in storage 210 and may utilize data stored in storage 210. If the data in storage 210 used by applications 202 is inaccessible, applications 202 may not be able to provide the computer implemented services.

Data manager 204 may provide data management services. Data management services may include (i) managing backup generation and storage to place the data in storage 210 utilized by applications 202 in a restorable state and (ii) restoring the data in storage 210 using the backups. To do so, data manager 204 may instantiate a snapshot for the data stored in storage 210. As will be discussed in greater detail below, the snapshot may be instantiated in a manner that avoids performing writes to various physical storage devices 218 of storage 210 thereby reducing wear on the storage devices 218 due to the writes while maintaining access to the snapshot, even as data in storage 210 is changed over time.

When providing its functionality, data manager 204 may perform all, or a portion, of the operations discussed with respect to FIGS. 3A-5.

In an embodiment, one or more of applications 202 and/or data manager 204 is implemented using a hardware device including circuitry. The hardware device may be, for example, a digital signal processor, a field programmable gate array, or an application specific integrated circuit. The circuitry may be adapted to cause the hardware device to perform the functionality of applications 202 and/or data manager 204. applications 202 and/or data manager 204 may be implemented using other types of hardware devices without departing from embodiments disclosed herein.

In one embodiment, applications 202 and/or data manager 204 is implemented using a processor adapted to execute computing code stored on a persistent storage that when executed by the processor performs the functionality of applications 202 and/or data manager 204 discussed throughout this application. The processor may be a hardware processor including circuitry such as, for example, a central processing unit or a microcontroller. The processor may be other types of hardware devices for processing digital information without departing from embodiments disclosed herein.

When performing the operations illustrated in FIGS. 3A-5 as well as the functionality of applications 202, applications 202 and/or data manager 204 may store data in storage 210.

In an embodiment, storage 210 is implemented using physical devices that provide data storage services (e.g., storing data and providing copies of previously stored data). The devices that provide data storage services may include hardware devices and/or logical devices. For example, storage 210 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 210 may include a memory device (e.g., a dual in line memory device) in which data is stored and from which copies of previously stored data are provided. In another example, storage 210 may include a persistent storage device (e.g., a solid-state disk drive) in which data is stored and from which copies of previously stored data is provided. In a still further example, storage 210 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 210 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

In an embodiment, storage 210 is implemented with any number of storage controllers 212 and any number of storage devices 218. The storage controllers 212 may service data access requests (e.g., read/write/erase requests) from applications 202, data manager 204, and/or other components (not shown). When doing so, storage controllers 212 may identify one or more storage devices (e.g., 220, 222) that will perform actions to service the storage requests, and may direct the data access requests to these storage devices. For example, storage controllers 212 may utilize information (e.g., logical unit identifiers associated with namespaces, other storage resource organizational data structures employed to manage storage resources of storage devices 218, storage devices 218 themselves, etc.) included in the data access requests to identify storage devices 218 that will perform one or more actions to service the data access requests. The storage access requests may then be substantially serviced by the storage devices. For example, the storage devices may use information included in data access requests (e.g., identifiers of namespaces and/or logical identifiers such as logical block addresses) to obtain storage media access information (e.g., physical block addresses, offsets, etc.) usable to access data in storage media of the storage devices. Consequently, storage controllers 212 may not need to expend significant resources for servicing data access requests even while both snapshots of data and data are maintained in storage because the storage controllers 212 may maintain the maps used for address translation and/or other purposes.

Storage devices 218 may include any number of physical storage devices (e.g., 220, 222) usable to persistently store data. In an embodiment, one or more of the physical storage devices 218 are implemented with storage resources that does not include write in place functionality, and that may have a limited number of write cycles. For example, when a storage device 218 receives a modification (e.g., a rewrite) for data in some of its storage resources, the storage device 218 may store the updated data in different storage resources without removing the data from its storage resources (e.g., at least until garbage collection is performed). In an embodiment, the storage resources correspond to storage blocks, or portions thereof, of storage media.

The one or more of storage devices 218 may also implement a garbage collection process to free storage space by, for example, reclaiming storage resources that are unused. For example, the garbage collection process may review storage resources, copy live data from the storage resources (e.g., from a source) to other storage resources (e.g., a destination), and treat the storage resources as being free (e.g., treat the source storage resources as being unused). In this manner, data that does not reflect live data (e.g., current data) but is stored in some storage resources may be eventually removed and the storage resources storing the data that does not reflect live data may be reclaimed for use. In an embodiment, one or more of storage devices 218 is implemented with a solid state storage device. The solid state storage device may be implemented with one or more flash memory chips and a flash memory controller chip. For additional details regarding storage devices 218, refer to FIG. 2B. For additional details regarding the data that may be stored in storage devices 218, refer to FIGS. 2C-2E.

While illustrated in FIG. 2A as including a limited number of specific components, a client in accordance with an embodiment may include fewer, additional, and/or different components than shown herein.

Figure 2B:
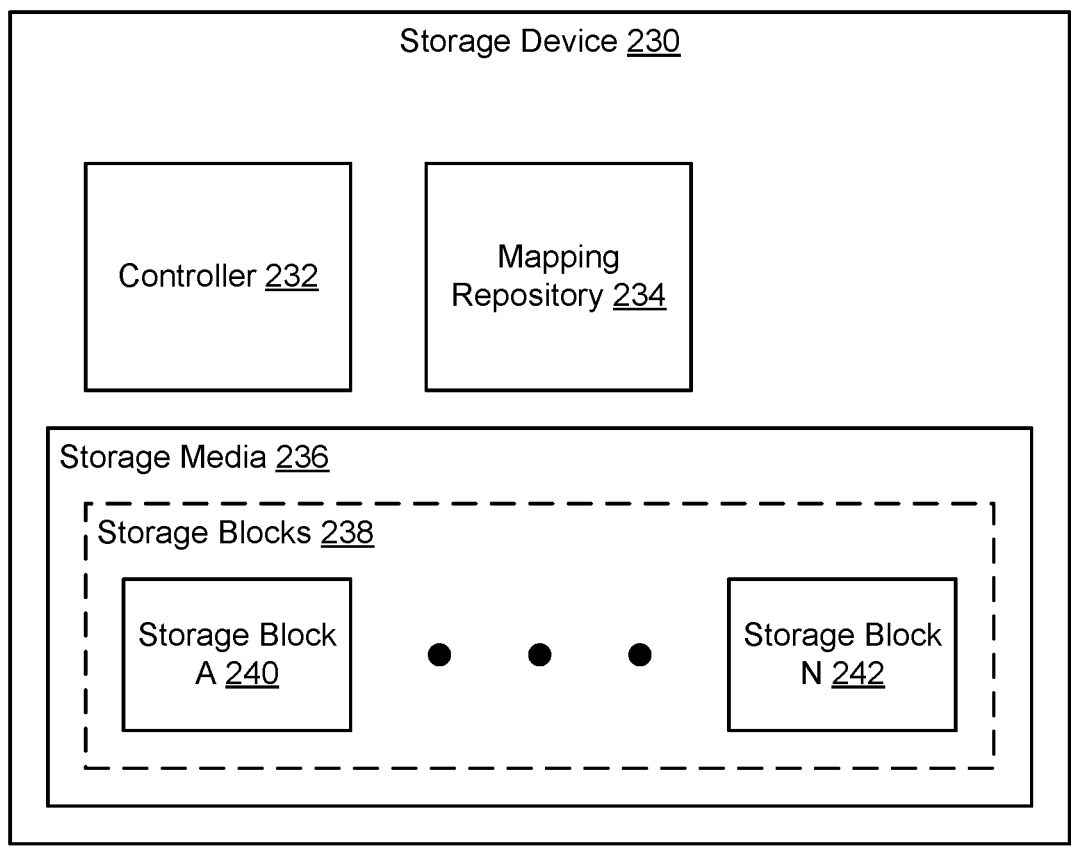
FIG. 2B shows a block diagram illustrating a storage device in accordance with an embodiment.

Turning to FIG. 2B, a diagram of an example storage device 230 is shown. Storage device 230 may include controller 232, mapping repository 234, and storage media 236.

Controller 232 may manage data access requests for data in storage media 236. To do so, controller 232 may (i) maintain mapping repository 234, (ii) store and read data from storage blocks 238 of storage media 236, and (iii) perform garbage collection on storage blocks 238 to free storage blocks 238 for use.

Mapping repository 234 may include information used to track where portions of live data and snapshots are stored in storage blocks 238. For example, mapping repository 234 may include a map for tracking live data (e.g., a data map) and a snapshot (e.g., a data snapshot map). When a request regarding live data is obtained, information in the data map may be used to identify and access portions of storage blocks. In contrast, when a request regarding a snapshot is obtained, information in the data snapshot map may be used to identify and access portions of storage blocks. As will be discussed in greater detail below, in an embodiment, portions of a data snapshot map may reference a data map. Consequently, when a request regarding snapshot data is obtained, information in the data map may also be used to identify and access portions of storage blocks.

Snapshots may only be maintained for limited durations of time. When a snapshot is no longer maintained, the tracking information in mapping repository 234 for the snapshot may be removed. Once removed, the data of the snapshot that is not duplicative of live data may be removed through garbage collection and the corresponding storage resources may be reclaimed over time.

When providing its functionality, controller 232 may perform all, or a portion, of the operations illustrated in FIGS. 3A-5.

In an embodiment, controller 232 is implemented using a hardware device including circuitry. The hardware device may be, for example, a digital signal processor, a field programmable gate array, or an application specific integrated circuit. The circuitry may be adapted to cause the hardware device to perform the functionality of controller 232. controller 232 may be implemented using other types of hardware devices without departing from embodiments disclosed herein.

In one embodiment, controller 232 is implemented using a processor adapted to execute computing code (e.g., computer instructions) stored on a persistent storage that when executed by the processor performs the functionality of controller 232 discussed throughout this application. The processor may be a hardware processor including circuitry such as, for example, a central processing unit or a microcontroller. The processor may be other types of hardware devices for processing digital information without departing from embodiments disclosed herein.

Mapping repository 234 may include one or more data structures that include information regarding data stored in storage media 236. For example, mapping repository 234 may include mappings between identifiers associated with data stored in storage media 236 and portions of storage blocks 238 in which the data is stored.

For example, in an embodiment, addressable units of storage media 236 may be organized using one or more namespaces (e.g., one corresponding to live data and another corresponding to a snapshot, when present). Each namespace may include a collection of addresses for the addressable units (e.g., a storage block, or portion thereof) of storage media 236. The addresses may be presented by storage device 230 to a host, controller, or other device, and mapping repository 234 may include mappings between the presented addresses and storage media 236.

The data structures of mapping repository 234 may be in-memory data structures stored in memory (not shown), may be persistently stored in persistent storage such as storage media 236, and/or may be stored in other locations. Refer to FIGS. 2D and 2E for additional details regarding mapping repository 234.

Storage media 236 may include one or more physical devices in which data may be persistently stored. The storage media 236 may include, for example, one or more flash memory chips (and/or other types of devices that do not include write-in-place functionality) operably connected to controller 232 and/or communications buses (not shown). Storage media 236 may include any quantity of storage resources that may store any quantity of data.

In an embodiment, the storage resources of storage media 236 are arranged in storage blocks 238, with each storage block including individually addressable clusters (with one or more clusters being referred to as a "portion") that correspond to an addressable unit of the storage media 236.

As discussed above, storage media 236 may not include write in place functionality. Consequently, when a modification to data stored in a portion of a storage block (e.g., 240, 242) is obtained, the modified data may be written to a different portion of the same or a different storage block, in some cases the modified data may always be written to portions of different storage blocks. When so written, the mapping repository 234 may be updated with an association between the different portion and the data without removing outdated data still stored in the portion of the storage block.

By virtue of lacking write in place functionality, garbage collection may be performed on storage media 236 to free storage space (e.g., by reclaiming storage blocks). To do so, a storage block may be selected, live data may be copied to other storage blocks, and the storage block (e.g., a source or original) may be marked or otherwise treated as free after the live data is migrated to other storage blocks and the mapping repository is updated accordingly. Consequently, when data is written to the portions of the storage block by virtue of it being treated as being free, the outdated data in the storage block may actually be removed (e.g., discarded, erased, etc.). As will be discussed in greater detail below, the time between when data becomes outdated and when it is removed may be of significance. In an embodiment, the retained outdated data is used to maintain a snapshot as the live data of storage device 230 diverges from the data of the snapshot. In this manner, the number of write cycles of storage media 236 used to maintain the snapshot may be reduced when compared to maintaining a snapshot by writing additional copies of outdated data for a snapshot when the snapshot diverges from the live data.

While illustrated in FIG. 2B as including a limited number of specific components, a storage device 230 in accordance with an embodiment may include fewer, additional, and/or different components than shown herein.

Figure 2C:
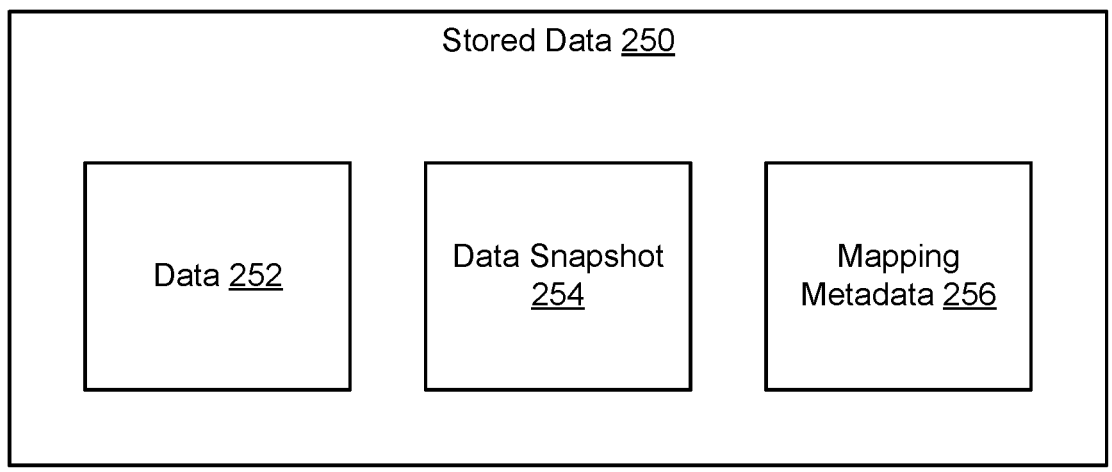
FIG. 2C shows a block diagram illustrating stored data in accordance with an embodiment.
Figure 2D:
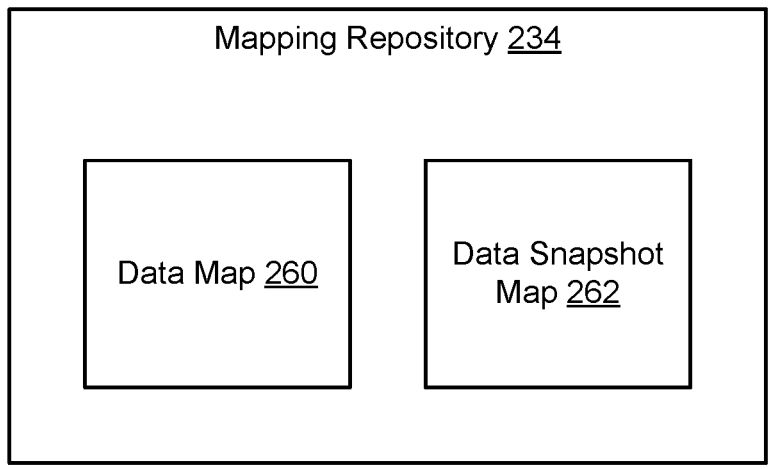
FIG. 2D shows a block diagram illustrating a mapping repository in accordance with an embodiment.
Figure 2E:
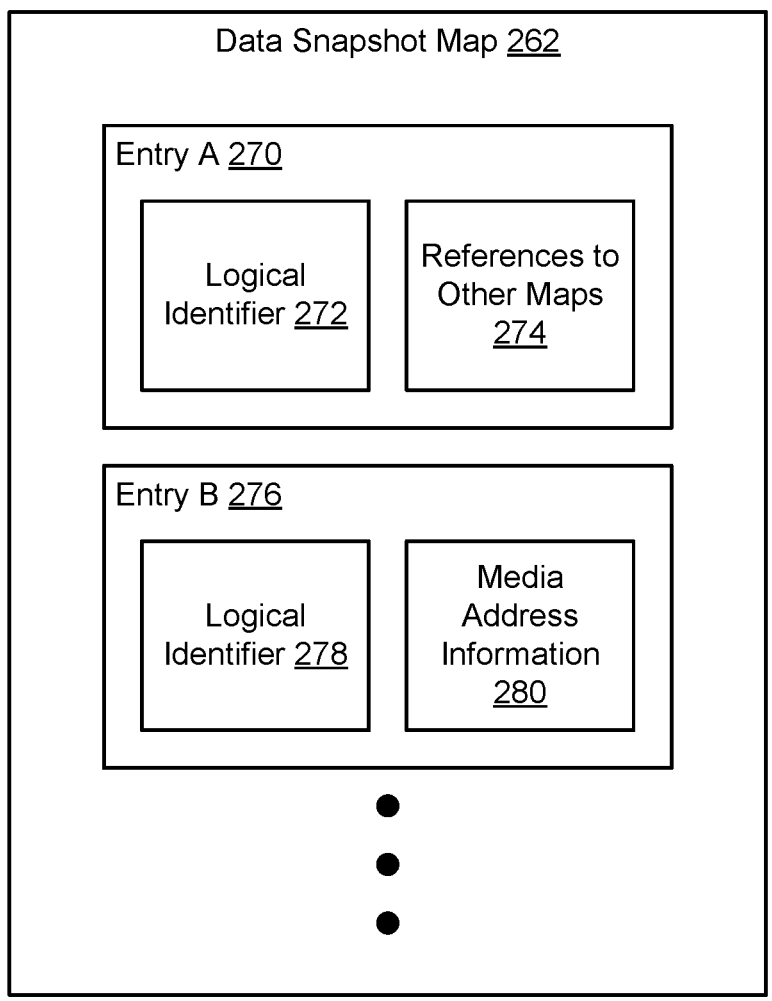
FIG. 2E shows a block diagram illustrating a data snapshot map in accordance with an embodiment.

Turning to FIG. 2C, example stored data 250 in accordance with an embodiment is shown. Stored data 250 may be similar to the data stored in any of storage devices 218. Stored data 250 may include data 252, data snapshot 254, and mapping metadata 256.

Data 252 may include any type and quantity of data (e.g., such as data used to provide computer implemented services). Any number of applications may utilize data 252 when providing services. Data 252 may be live data (e.g., current data), and may be modified over time.

Data snapshot 254 may include any type and quantity of data. In contrast to data 252, data snapshot 254 may not be live. Rather, data snapshot 254 may reflect data of a client at a point in time. Data snapshot 254 may be used for backup purposes. In some cases, various portions of data snapshot 254 may be duplicative of portions of data 252. In such cases, multiple copies of the duplicative portions may not be stored. Rather, information included in mapping repository 234 may be updated such that only single copy of data stored in a portion of a storage block is used to store the corresponding portion of data 252 and data snapshot 254. Once the portion of data 252 diverges from the duplicative portion of data snapshot 254, then a portion of a storage resource (e.g., a storage block of storage media 236) may be consumed to store the now non-duplicative portion of data 252. Specifically, the original portion of a storage block storing the duplicative data may be used to maintain storage of the corresponding portion of data snapshot 254 while the modified data may be stored in another portion of a storage block of storage media 236.

Mapping metadata 256 may associate various portions of storage blocks, in which portions of data 252 and/or data snapshot 254 are stored, with corresponding portions of mapping repository. As will be discussed below, mapping metadata 256 and the data in the mapping repository may be utilized to ascertain whether various portions of data blocks store portions of data 252 and/or data snapshot 254.

In an embodiment, mapping metadata 256 is maintained over time for integrity purposes. Mapping metadata 256 may be maintained for integrity purposes with journaling, change tracking, and/or other methods. For example, when a change to mapping metadata 256 is made, the change may be recorded to obtain a record of the changes to mapping metadata 256 over time. The record of the changes to mapping metadata 256 may be used, for example, to rebuild mapping metadata 256 by sequentially using the changes to obtain a representation of mapping metadata 256 after some number of changes were made to it. While discussed with respect to mapping metadata 256, similar integrity processes may be used with respect to any of the data structures disclosed herein.

Any of the data structures shown in FIG. 2C may be implemented with any type (e.g., lists, tables, databases, linked lists, unstructured data, trees, etc.) and quantity of data structures.

Turning to FIG. 2D, a diagram of mapping repository 234 in accordance with an embodiment is shown. Mapping repository 234 may include any number of data structures usable to organize storage of data in portions of storage blocks. For example, mapping repository 234 may include data map 260 and data snapshot map 262.

Data map 260 may include one or more data structures that store associations between portions of data 252 (e.g., more specifically, addresses presented by storage media corresponding to the portions of data 252) and storage media address information usable to retrieve the portions of data 252. For example, the storage media address information may include a block identifier for a storage block, an offset to a portion of the storage block, and/or other types of information (e.g., physical address information) usable to access the portion of data 252.

The information included in data map 260 may allow live data to be retrieved from storage. For example, consider a scenario where an application desires to access a portion of data 252. To access the portion, a data access request may be provided to storage 210. The data access request may specify (i) logical block addresses (or other types of logical identifiers) associated with the portion and (ii) an identifier of the data map 260. When a storage device receives the data access request, the storage device may identify, based on the identifier of the data map, that the data map is to be used to translate the logical block address to storage media address information usable to read portions of one or more storage blocks 238 to retrieve the requested portion of data 252.

Data snapshot map 262 may include one or more data structures that store associations between portions of data snapshot 254 (e.g., more specifically, addresses presented by storage media corresponding to the portions of data snapshot 254) and information usable to retrieve the portions of data snapshot 254. For example, the storage information usable to retrieve the portions of data snapshot 254 may include (i) references to portions of data map 260 (e.g., when the portion of data snapshot 254 is duplicative of the corresponding portion of data 252, and only a single copy of the duplicative data is stored, in some cases, empty portions of data snapshot map 262 may indicate a reference to corresponding portions of data map 260) and/or (ii) storage media address information usable to retrieve the portions of data snapshot 254 (e.g., when the portion of data snapshot 254 is not duplicative of the corresponding portion of data 252). For example, the storage media address information may include a block identifier for a storage block, an offset to a portion of the storage block, and/or other types of information (e.g., physical address information) usable to access the portion of data snapshot 254.

The information included in data snapshot map 262 may allow portions of a snapshot to be retrieved from storage. For example, consider a scenario where an application desires to access a portion of data snapshot 254. To access the portion, a data access request may be provided to storage 210. The data access request may specify (i) logical block addresses (or other types of logical identifiers) associated with the portion and (ii) an identifier of the data snapshot map 262. When a storage device receives the data access request, the storage device may identify, based on the identifier of the data snapshot map, that the data snapshot map is to be used to translate the logical block address to storage media address information usable to read portions of one or more storage blocks 238 to retrieve the requested portion of data snapshot 254.

In an embodiment, data map 260 and data snapshot map 262 correspond to the same logical address range of storage media. For example, these maps may both be limited to the same address range of the storage media.

Because data snapshot maps may not be maintained indefinitely, data snapshot map 262 may be deleted after a corresponding snapshot is no longer being maintained. Once deleted, the non-duplicative data of the snapshot may be removed through garbage collection, discussed in greater detail with respect to FIG. 3G.

Turning to FIG. 2E, a diagram of data snapshot map 262 in accordance with an embodiment is shown. Data snapshot map 262 may include any number of entries (e.g., 270, 276). Entries 270, 276 may include information usable to access data stored in portions of storage blocks of a storage device.

Each of entries 270, 276, may include logical identifier 272, 278. The logical identifier may include information regarding the data stored in a portion of a storage block identifiable by other portions of the entry. When a data access request is received, the data access request may include a copy of or information related to the logical identifier thereby allowing any number of entries to be identified. For example, logical identifier 272, 278 may be a logical block address and the data access request may include the logical block address and an identifier of data snapshot map 262 (e.g., so that storage device may be directed to use the data snapshot map 262 rather than data map 260 to obtain media access information).

Each of entries 270, 276 may also include information usable to identify, access, and/or otherwise interact with portions of storage blocks in which portions of data snapshot 254 are stored. Depending on whether the portion of data snapshot 254 identified by the logical identifier 272, 278 is duplicative, the entries may include references to other maps or may include storage media address information.

For example, some entries (e.g., 270) may include one or more references to other maps 274. The references to other maps 274 may include information usable to obtain associations specified by these other maps. The references to other maps 274 may specify logical identifiers or other types of index information for entries of data map 260. In an embodiment, the references to other maps may be implemented with entries that do not include storage media address information or references to other maps. The lack of such information may indicate that the entry is to be treated as including a reference to a corresponding entry of another map. In the context of data snapshot map 262, such an entry may be treated as a reference to a corresponding entry of data map 260. In an embodiment, both data map 260 and data snapshot map 262 include the same number of entries, and may be organized in a similar manner. Thus, the organization of an entry of data snapshot map 262 (e.g., an entry number) may be used to identify the corresponding entry of data map 260.

In another example, some other entries (e.g., 278) may include storage media address information 280. The storage media address information may, as discussed above, allow for direct storage block access. For example, storage media address information 280 may include block identifiers, offsets, and/or other types of information usable to access portions of storage blocks in which portions of data snapshot 254 associated with the entries are stored.

As discussed above, the components of FIG. 1 may perform various methods to increase the likelihood of clients being able to access data for computer implemented services. FIGS. 3A-5 illustrate examples of methods that may be performed by the components of FIG. 1. In the diagrams discussed below and shown in FIGS. 3A-5, any of the operations may be repeated, performed in different orders, and/or performed in parallel with or in a partially overlapping in time manner with other operations.

Figure 3A:
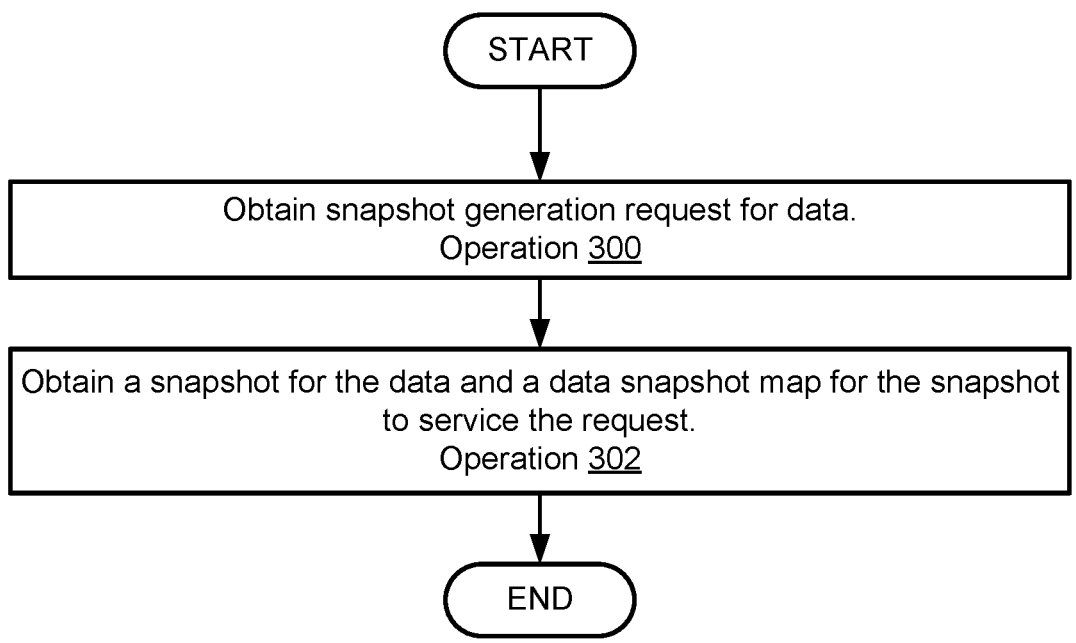
FIG. 3A shows a flow diagram illustrating a method of generating a snapshot in accordance with an embodiment.

Turning to FIG. 3A, a flow diagram illustrating a method of preparing to generate a backup for a client in accordance with an embodiment is shown.

Figure 4:
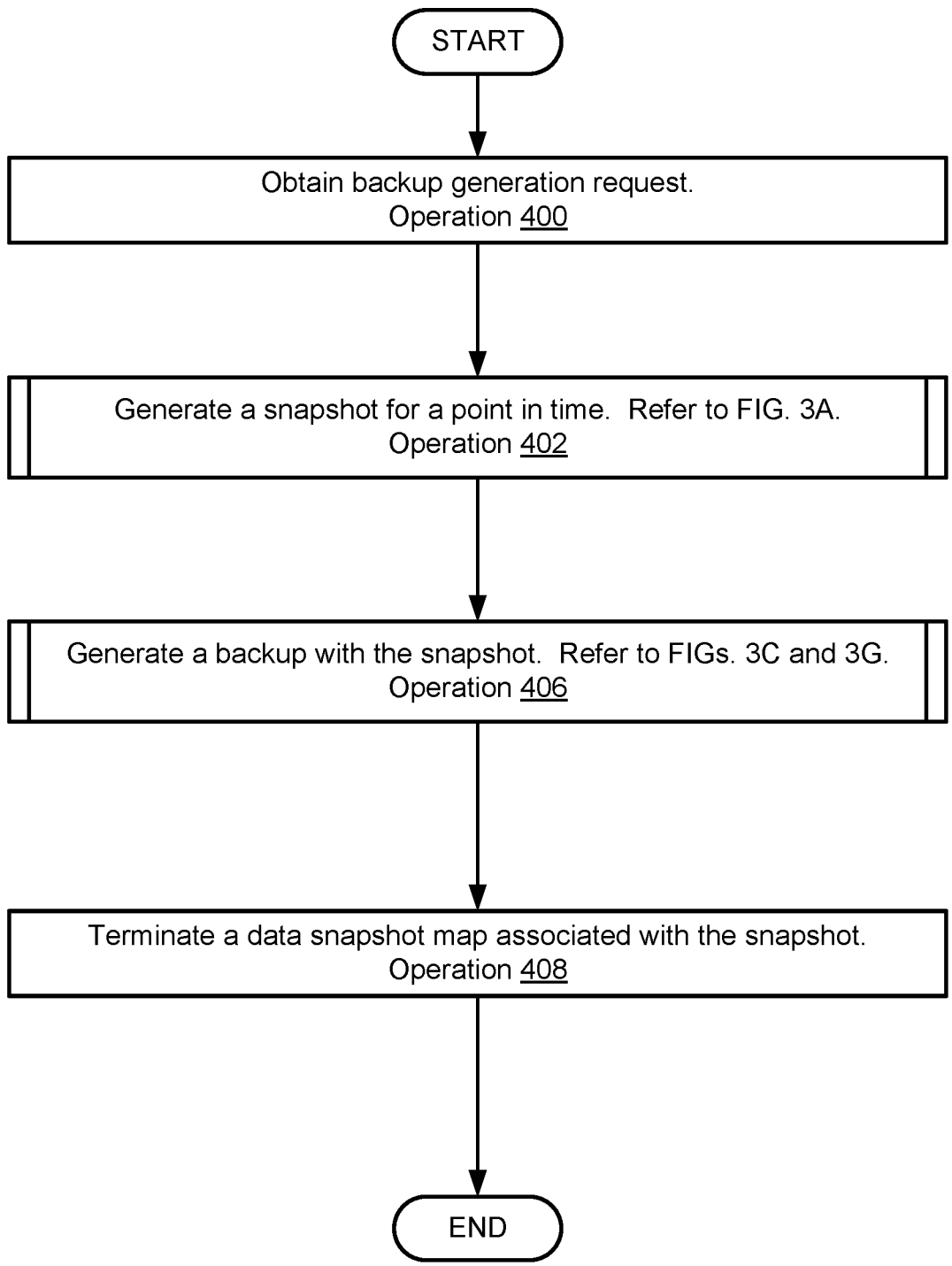
FIG. 4 shows a flow diagram illustrating a method of generating a backup in accordance with an embodiment.

Prior to operation 300, a client may be queued to generate a backup for any reason. Refer to FIG. 4 for additional details regarding backup generation.

At operation 300, a snapshot generation request for data is obtained. The data may be stored in portions of storage blocks. The data, at the time the snapshot generation request is obtained, may be live data.

In an embodiment, the snapshot request is obtained from a schedule that specifies when snapshots and corresponding backups are to be obtained/generated. The snapshot request may be obtained from a management entity (e.g., that is part of and/or separate from the client) via a message passed to a data manager of client. The snapshot request may be obtained via other methods without departing from embodiments disclosed here.

At operation 302, a snapshot for the data is obtained. A data snapshot map for the snapshot may also be obtained to service the snapshot generation request.

In an embodiment, the snapshot is obtained by generating a data snapshot map. The data snapshot map may be generated by generating a data snapshot map that includes entries similar to a data map that maps to the live data of the client at the time the snapshot is generated (e.g., which may be a point in time to which a subsequently generated backup will be associated, at least in part), but may include references to the corresponding entries of the data map rather than storage media address information. For example, when the data snapshot map is generated, the data of the client and the data for the snapshot may be identical. Thus, rather than storing an additional copy of the data as a snapshot, a data snapshot may be generated which includes references to a data map which, in turn, references the data blocks in which a single copy of the data is stored.

In an embodiment, the data snapshot map may be implemented as an empty data structure, which may be changed later as will be discussed with respect to FIG. 3C. For example, because the data snapshot may be initially completely duplicative of the data map, no data may be added. When the data snapshot map is used, if the data snapshot map does not include a mapping, then the data storage device (e.g., the controller) may automatically use the data map to obtain data (e.g., by looking up the storage media address information in the data map).

The method may end following operation 302.

Figure 3B:
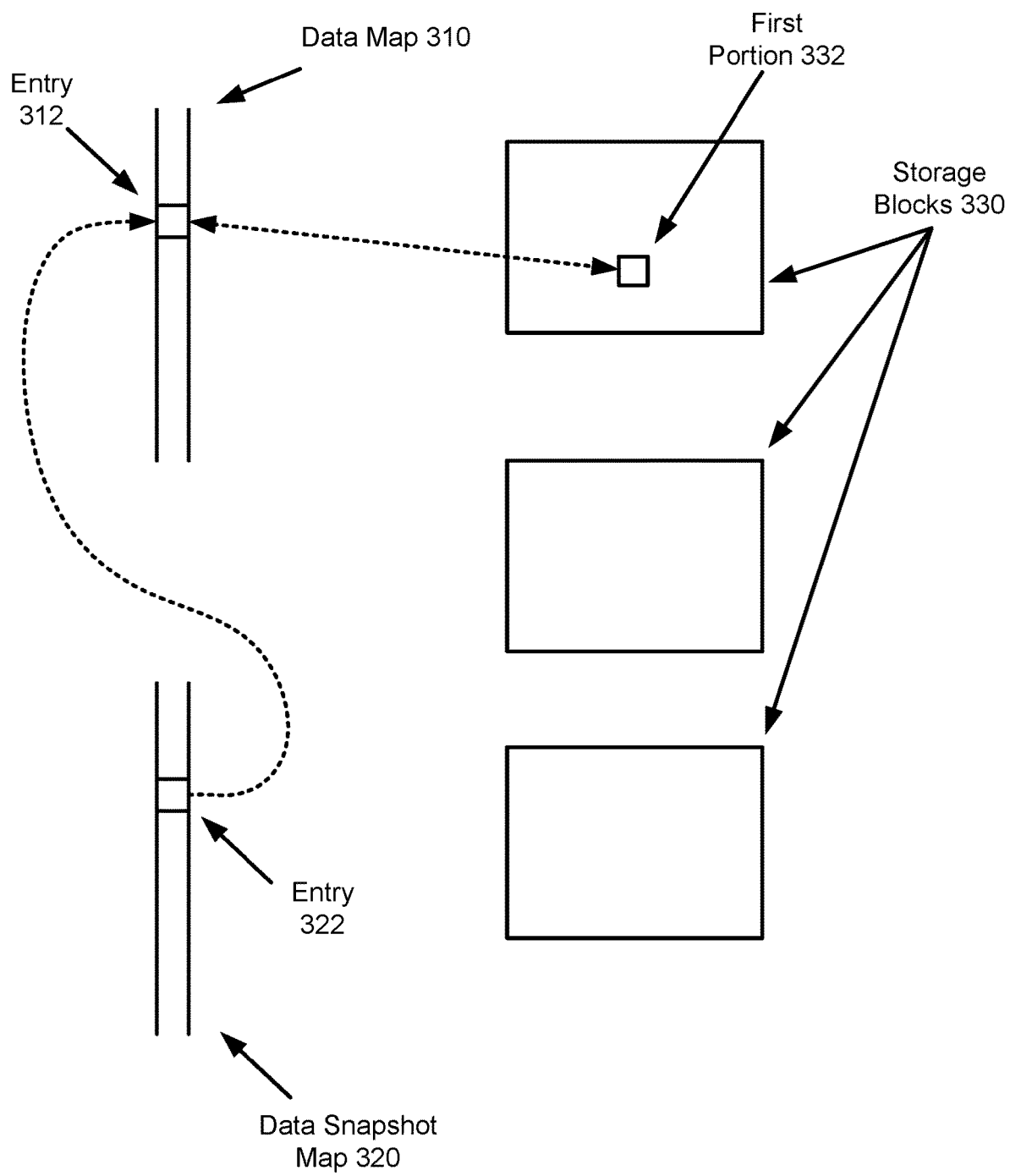
FIG. 3B shows a block diagram illustrating data indexing in accordance with an embodiment.

Turning to FIG. 3B, a diagram of indexing with a data map 310 and a data snapshot map 320 in accordance with an embodiment is shown. In FIGS. 3B, 3D-3F, and 3H-3J, references are shown using dashed lines that terminate in one or more arrows. A line that terminates in a single arrow indicates that the data structure from which the line emanates references a data structure near which the line terminates in the arrow. In contrast, a line having both ends that terminate in arrows indicates that the data structures near either ends of the line reference each other. For example, in FIG. 3B, entry 322 references entry 312 while entry 312 and metadata associated with first portion 332 of a storage block reference each other.

As discussed above, when data and a data snapshot are similar, data snapshot map 320 may, in an entry 322, reference an entry 312 of data map 310. Entry 312 of data map 310 may include storage media address information usable to access or otherwise identify a first portion 332 of a storage block (e.g., 330) in which requested data from a data snapshot is stored.

As a client operates after a data snapshot is generated, the data snapshot and the data may begin to diverge. As the data diverges, data map 310 and data snapshot map 320 may be updated to reflect this divergence.

Prior to the divergence, for example, both live data and a snapshot may include a portion of data stored in first portion 332. To read live data, a data access request may be presented to a storage device that (i) identifies data map 310 and (ii) includes a logical identifier corresponding to entry 312. The storage device may, based on the identification of the data map 310, use the logical identifier to identify entry 312 and obtain storage media address information from entry 312. In contrast, to read a portion of the snapshot, a data access request may be presented to a storage device that (i) identifies data snapshot map 320 and (ii) includes a logical identifier corresponding to entry 322. The storage device may, based on the identification of the data snapshot map 320, use the logical identifier to identify entry 312. Because, in this scenario, entry 322 references entry 312 (e.g., by not including storage media access information), the storage device identifies entry 312 as corresponding to entry 322 (e.g., by virtue of the organization of the entries of each of the maps and the snapshot/live-data relationship of data and data snapshot) and obtains storage media address information from entry 312. Thus, in this scenario, the storage media address information from entry 312 is used to satisfy data access requests for both the data and data snapshot.

Figure 3C:
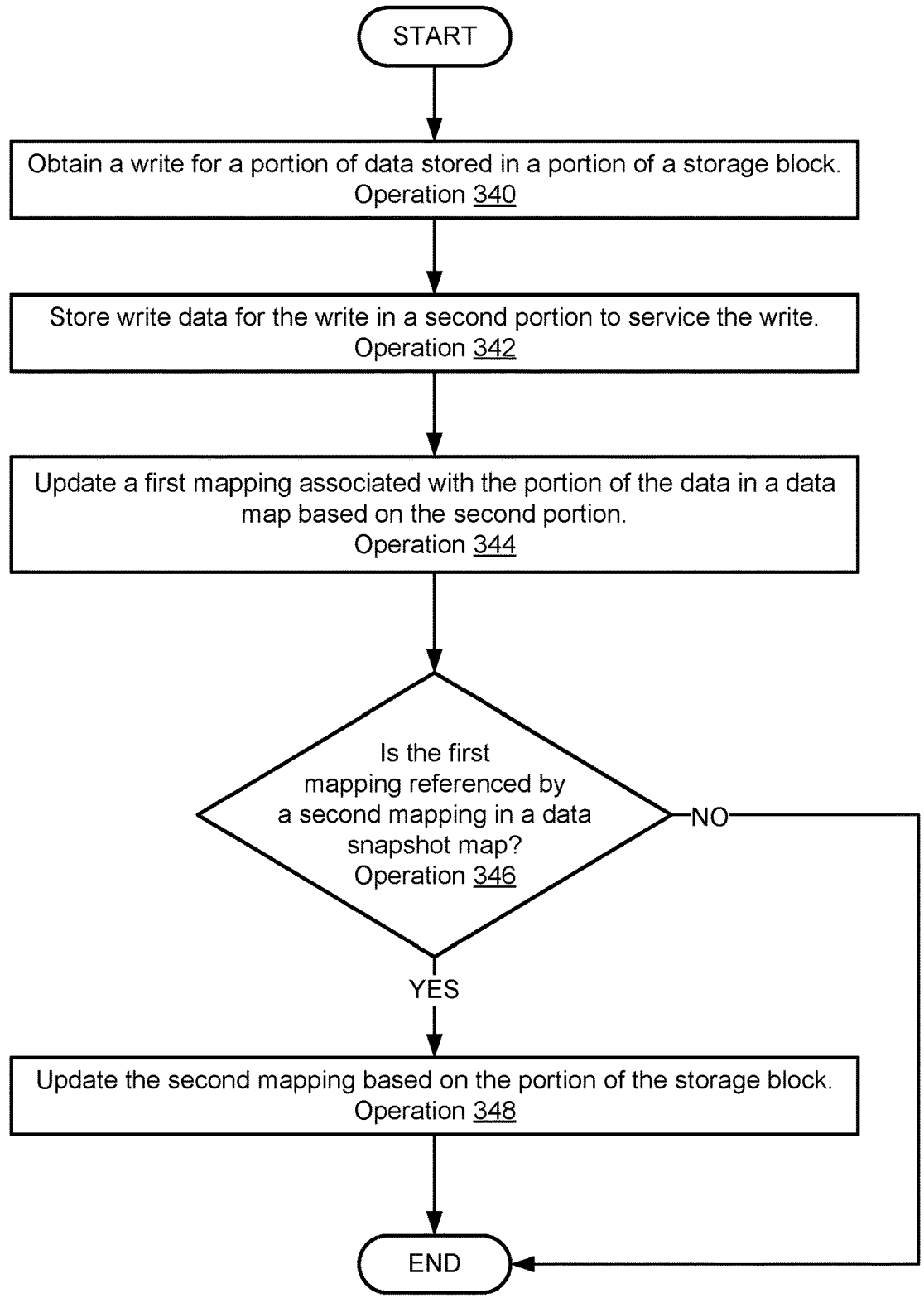
FIG. 3C shows a flow diagram illustrating a method of storing data in accordance with an embodiment.

Turning to FIG. 3C, a flow diagram illustrating a method of writing data in accordance with an embodiment is shown. In an embodiment, the method is performed while a data snapshot is being maintained by the client.

At operation 340, a write for a portion of data stored in a portion of a storage block is obtained. The write may be for live data. The write may include, for example, an identifier of the data map and a logical identifier such as a logical block address. The write (e.g., a data access request) may be obtained from an application or another entity.

At operation 342, write data for the write is stored in a second portion of a storage block to service the write. In other words, rather than overwrite (which may not be supported by storage media of the storage device in which the portion of the data is stored) the portion of the storage block, the modified data from the portion of the storage block may instead be stored in the second portion, which may be part of a same or a different storage block.

At operation 344, a first mapping associated with the portion of the data in a data map is updated based on the second portion. The first mapping may be stored in an entry in the data map. The first mapping may be updated by replacing the media access information in the first mapping with media access information for the second portion. In this manner, when the first mapping is used in the future for data retrieval/access purposes, the mapping may direct the controller to read the second portion rather than the first portion.

At operation 346, it is determined whether the first mapping is referenced by a second mapping in a data snapshot map. As discussed above, the data snapshot map may include an entry that references the first mapping when, prior to the write of operation 340, a portion of the data snapshot stored in the portion of the storage block is identical to a portion of the data stored in the portion of the storage block. In other words, when the data snapshot would otherwise be duplicative of the data.

However, by virtue of the write of operation 340, the data may diverge from the data snapshot thereby requiring that different data be stored for the data and the data snapshot. Because storage media of the storage device may not support write in place operations, the updated data may be stored in operation 342 and the corresponding data map may be updated in operation 344 leaving only the data snapshot map to be updated. But, in some cases, the data and data snapshot may have already diverged thereby causing a reference to the data map to be previously removed from the data snapshot map.

If the first mapping is referenced by a second mapping in the data snapshot map, then the method may proceed to operation 348. If the first mapping is not referenced by the second mapping in the data snapshot map, then the method may end following operation 346.

At operation 348, the second mapping (e.g., a snapshot mapping) is updated based on the portion of the storage block. In an embodiment, the second mapping is updated by removing a reference to the first mapping and replacing it with storage media access information for the portion of the storage block. Thus, in this scenario, the second mapping may direct subsequent data access to the portion of the storage block in which the data prior to writing is stored and not modified thereby reflecting the data snapshot. In contrast, if the first mapping is not referenced by the second mapping in the data snapshot map in operation 346, then the second mapping would already have been updated by virtue of the previous divergence of the data from the data snapshot.

The method may end following operation 348.

Figure 3D:
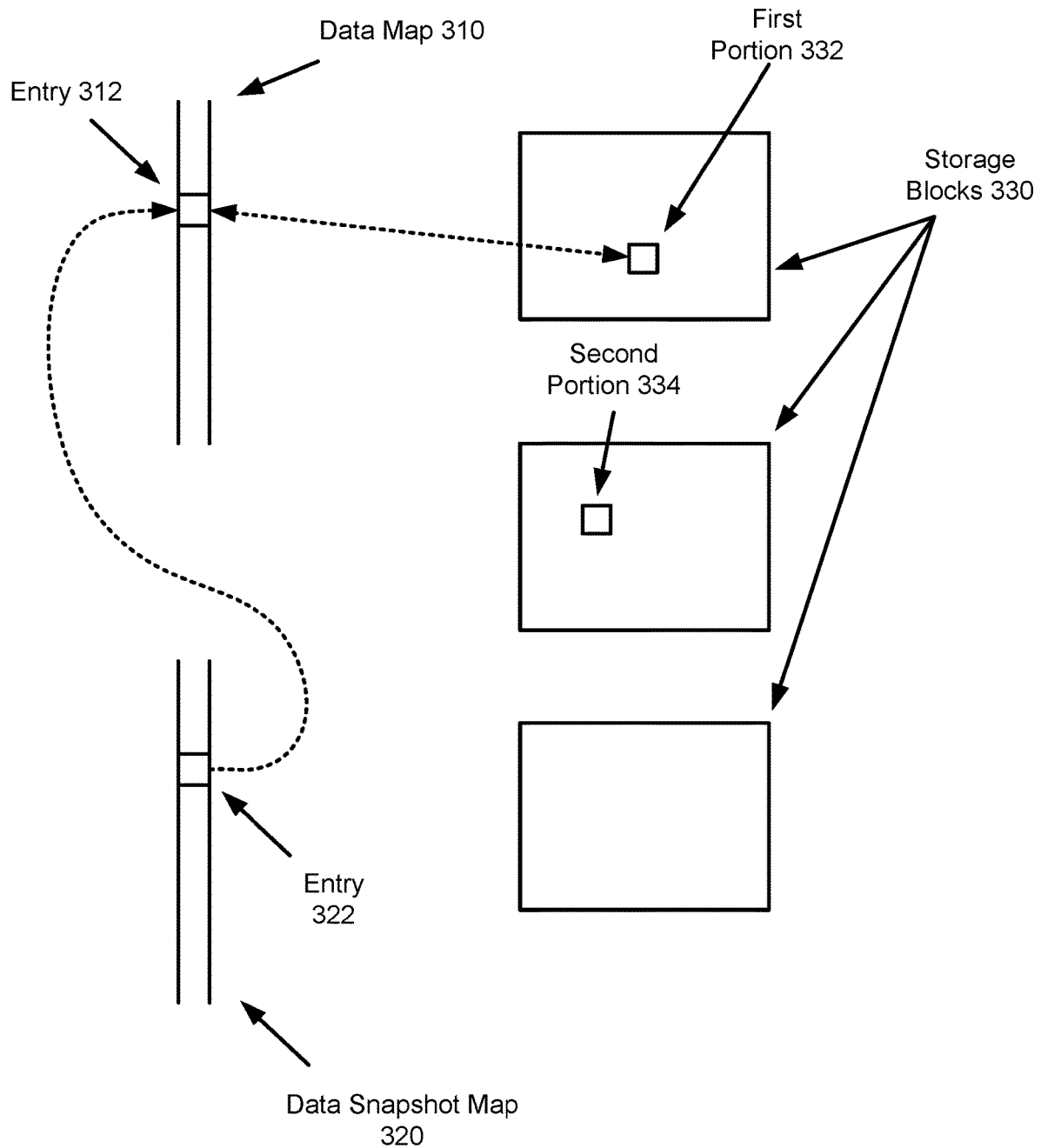
FIGS. 3D-3F show block diagrams illustrating data storage in accordance with an embodiment.
Figure 3E:
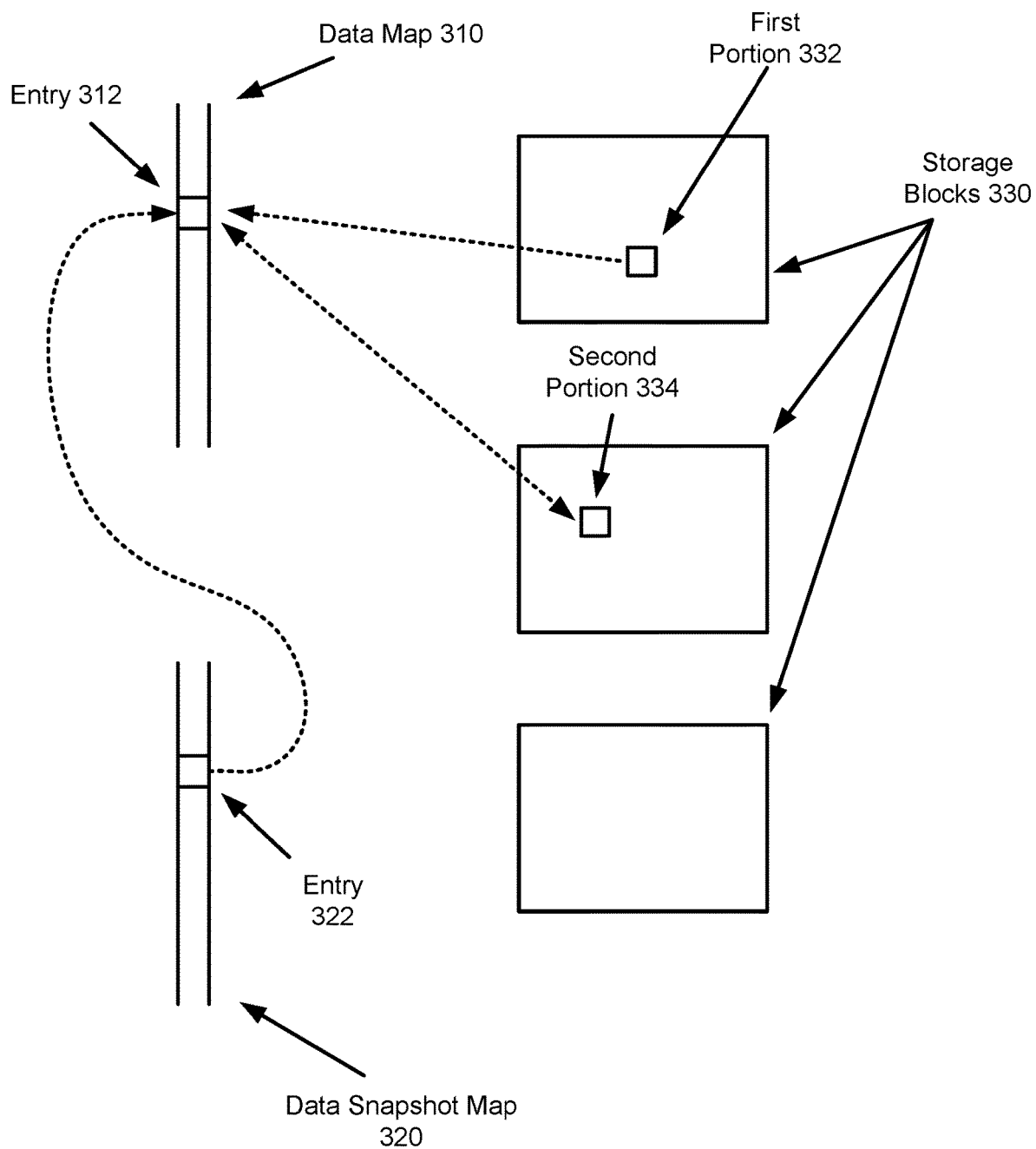
Figure 3F:
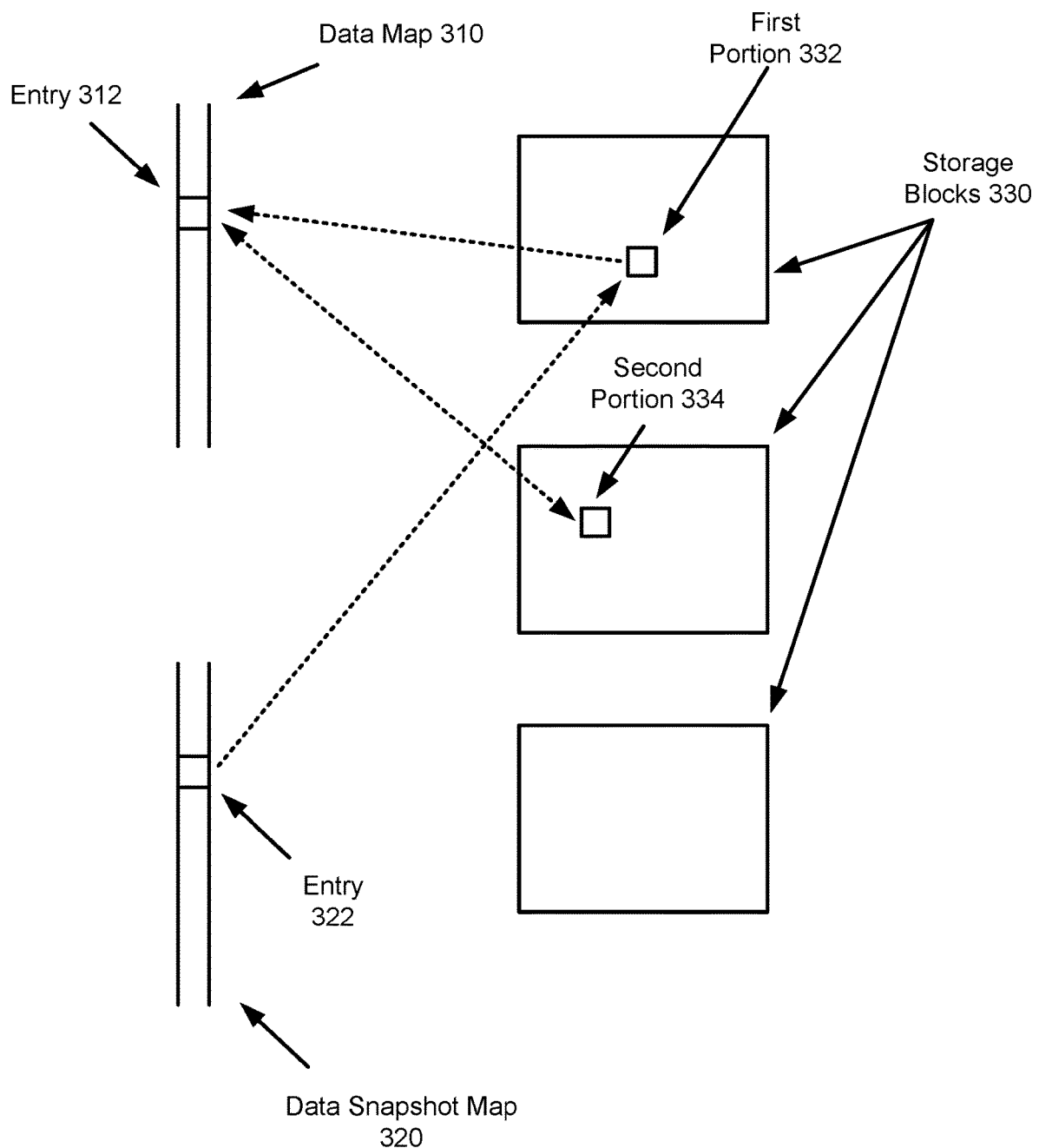

Turning to FIGS. 3D-3F, diagrams of indexing with a data map 310 and a data snapshot map 320 in accordance with an embodiment are shown. Consider a scenario where, following the description of FIG. 3B and as illustrated in FIG. 3D, a write for data in first portion 332 is obtained. Because writing in place may not be available, the to-be-written data may be written to second portion 334 of a storage block of the storage blocks 330 in which data may be stored. Consequently, the original data in pre-written state may still be stored in first portion 332.

Turning to FIG. 3E, with the changed data written to second portion 334, entry 312 may be updated with the media access information for second portion 334. Also, the mapping metadata associated with second portion 334 may be updated to reference entry 312. In this manner, the live data may be maintained by ensuring that at least one data map references it.

Turning to FIG. 3F, entry 322 may also be updated to maintain the data snapshot. Because the data in first portion 332 was not changed, entry 322 may be updated to reference it. For example, the reference to entry 312 included in entry 322 may be removed and replaced with storage media access information for first portion 332. Consequently, the data corresponding to the data snapshot may be accessed using data snapshot map 320 while the changed data (e.g., the live data) stored in second portion 334 may be accessed using data map 310.

If a write for data in second portion 334 is obtained, only entry 312 may be updated to reflect the portion (not shown) of a storage block where the newly written data is stored when the write is serviced. Entry 322 may not be further updated because it now directly references a data storage location which may not change until garbage collection, or another type of process is performed (other than normal read, write, erase command servicing processes).

After the write, as seen in FIG. 3F, the live data and snapshot may include different portions of data stored in first portion 332 and second portion 334. To read the live data, a data access request may be presented to a storage device that (i) identifies data map 310 and (ii) includes a logical identifier corresponding to entry 312. The storage device may, based on the identification of the data map 310, use the logical identifier to identify entry 312 and obtain storage media address information from entry 312. The obtained storage media address information may be used to access second portion 334. In contrast, to read a corresponding portion of the snapshot, a data access request may be presented to a storage device that (i) identifies data snapshot map 320 and (ii) includes a logical identifier corresponding to entry 322. The storage device may, based on the identification of the data snapshot map 320, use the logical identifier to identify entry 322. Because, in this scenario, entry 322 includes storage media access for first portion 332, the storage device uses the storage media access info to read first portion 332. Thus, different data is read from two different portions is read to satisfy the respective data access requests.

Figure 3G:
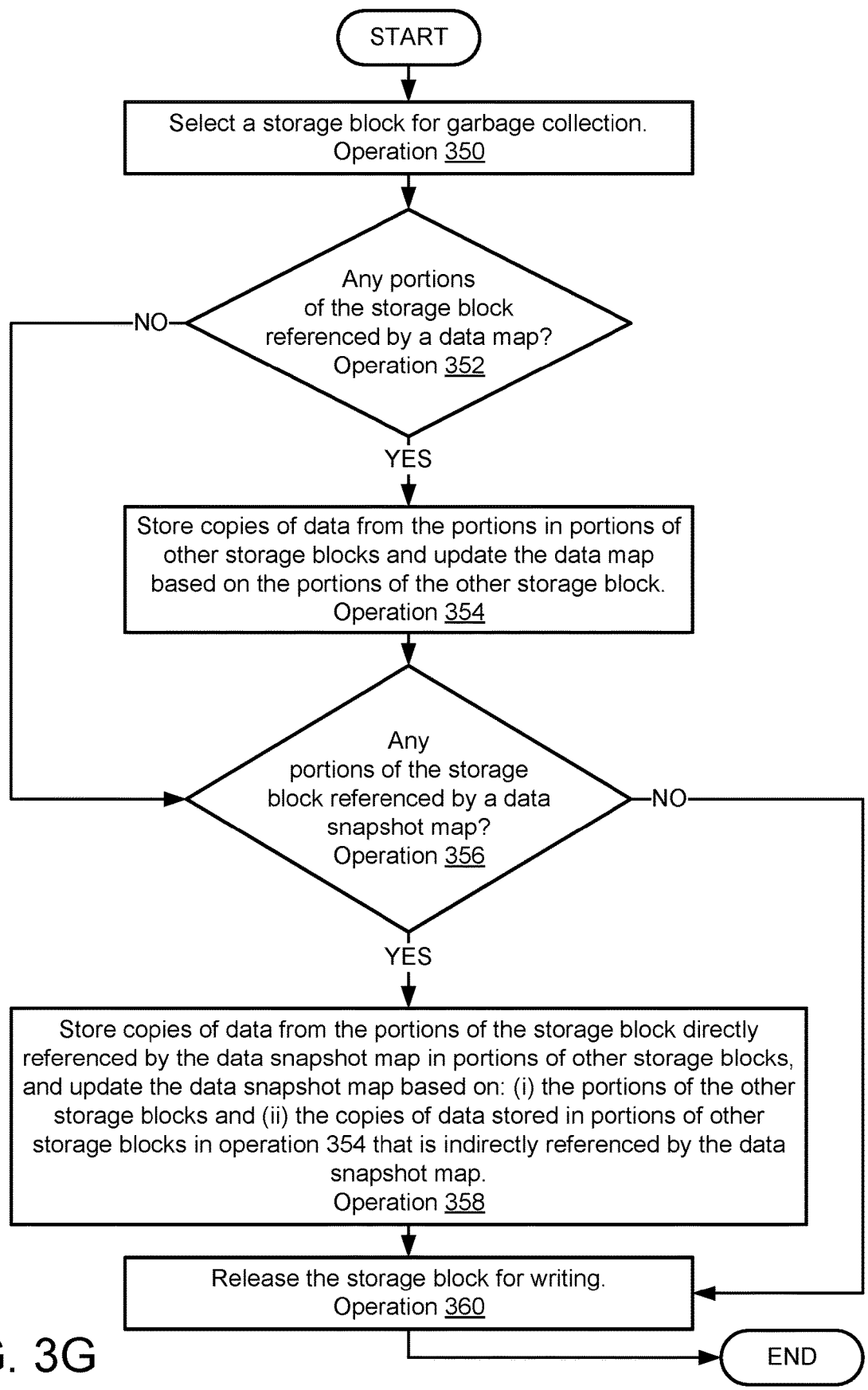
FIG. 3G shows a flow diagram illustrating a method of garbage collection in accordance with an embodiment.

Turning to FIG. 3G, a flow diagram illustrating a method of performing garbage collection in accordance with an embodiment is shown. In an embodiment, the method is performed while a data snapshot is being maintained by the client and the live data of the client continues to be changed over time.

At operation 350, a storage block is selected for garbage collection. The storage block may be selected using any method. For example, the storage block may be selected based on a write balancing algorithm, an aging algorithm, and/or via other methods. The storage block may store, in one or more portions, some data and/or some of a data snapshot.

At operation 352, it is determined whether any portions of the storage block are referenced by a data map. Any portions of the storage block reference by the data map may be treated as storing live data. Consequently, the data from these portions of the storage block may be selected for retention.

The determination may be made using mapping metadata associated with the portions of the storage block. As discussed above the mapping metadata associated with a portion of a data block may reference associations specified by a data map if the portion stores data referenced by the data map. To make the determination, the associations in the data map referenced by the mapping data may be checked to determine whether the associations reciprocate by referencing the portion (e.g., as indicated by the dashed lines with both ends terminating in an arrow FIGS. 3B, 3C-3F, and 3H-3J). If the association reciprocates, then it may be determined that the portion of the storage block is referenced by the data map.

In an embodiment, the associations are checked in a computationally efficient manner. For example, the mapping metadata may specify (e.g., with an identifier of an entry or other identifier usable to distinguish a particular association from other associations) an association in the data map that is to be checked. Only the specified association may be checked, no other associations may be checked for reciprocation.

If any portion of the storage block is referenced by the data map, then the method may proceed to operation 354, otherwise the method may proceed to 356. Proceeding to operation 354 may indicate that there is live data in the storage block that needs to be copied to other storage block prior to freeing the storage block.

At operation 354, copies of data from the portions of the storage block are stored in portions of another storage block. In other words, the data from the portions of the storage block referenced by the data map are copied to other storage blocks. The data map may be updated based on the portions of the other storage blocks. In other words, the data map may be updated to reflect the new storage locations of the portions of live data copied to the other storage blocks.

At operation 356, it is determined whether any portions of the storage block are referenced by a data snapshot map. The references may be direct (e.g., the data snapshot map may include media access information) or may be indirect (e.g., the data snapshot map may include references to the data map).

In an embodiment, the data map and the data snapshot map may have a same number of entries, with indexes of the entries corresponding between the maps. In such a scenario, the mapping metadata associated with the storage block may reference an association in the data map. However, the data snapshot may be correspondingly indexed to determine whether the data snapshot map references portions of the storage block. Accordingly, the determination may be made by checking a single association in the data snapshot map, corresponding to an association in the data map. No other associations in the data snapshot map may be checked to make the determination.

If any portions of the storage map are referenced by the data snapshot map, then the method may proceed to operation 358. Otherwise the method may proceed to operation 360 following operation 356.

In operation 358, copies of data from the portions of the storage block directly referenced by the data snapshot map are stored in other storage blocks (e.g., stored in writable storage blocks rather than storage blocks that are being garbage collected). The data snapshot map may also be updated based on (i) the portions of the other storage blocks (e.g., to reflect the new storage locations for the copied data) and (ii) the copies of data stored in portions of other storage blocks in operation 354 that is indirectly referenced by the data snapshot map. For example, as discussed above, the data snapshot map may indirectly reference stored data through the data map when the data and data snapshot include duplicative data. Thus, the data snapshot map may also update its references to the data map when data referenced by the data map is copied to other storage blocks during garbage collection. In contrast, outside of for garbage collection purposes, copying of data referenced by the data map may otherwise indicate a divergence of the data from the data snapshot thereby necessitating the portion of the data and the portion of the snapshot data that were previously identical to now be stored separately from one another.

At operation 360, the storage block is released. The storage block may be released for writing thereby freeing storage resources of the client. For example, subsequent writes may be serviced by storing data in the first storage block after it is reclaimed, which may including erasing the first storage block.

If a snapshot is no longer being used, the data snapshot map may be deleted. Consequently, when the method illustrated in FIG. 3G is performed, snapshot data that is not duplicative of live data may be deleted over time and the corresponding storage blocks may be released for subsequent writes.

The method may end following operation 360.

Figure 3H:
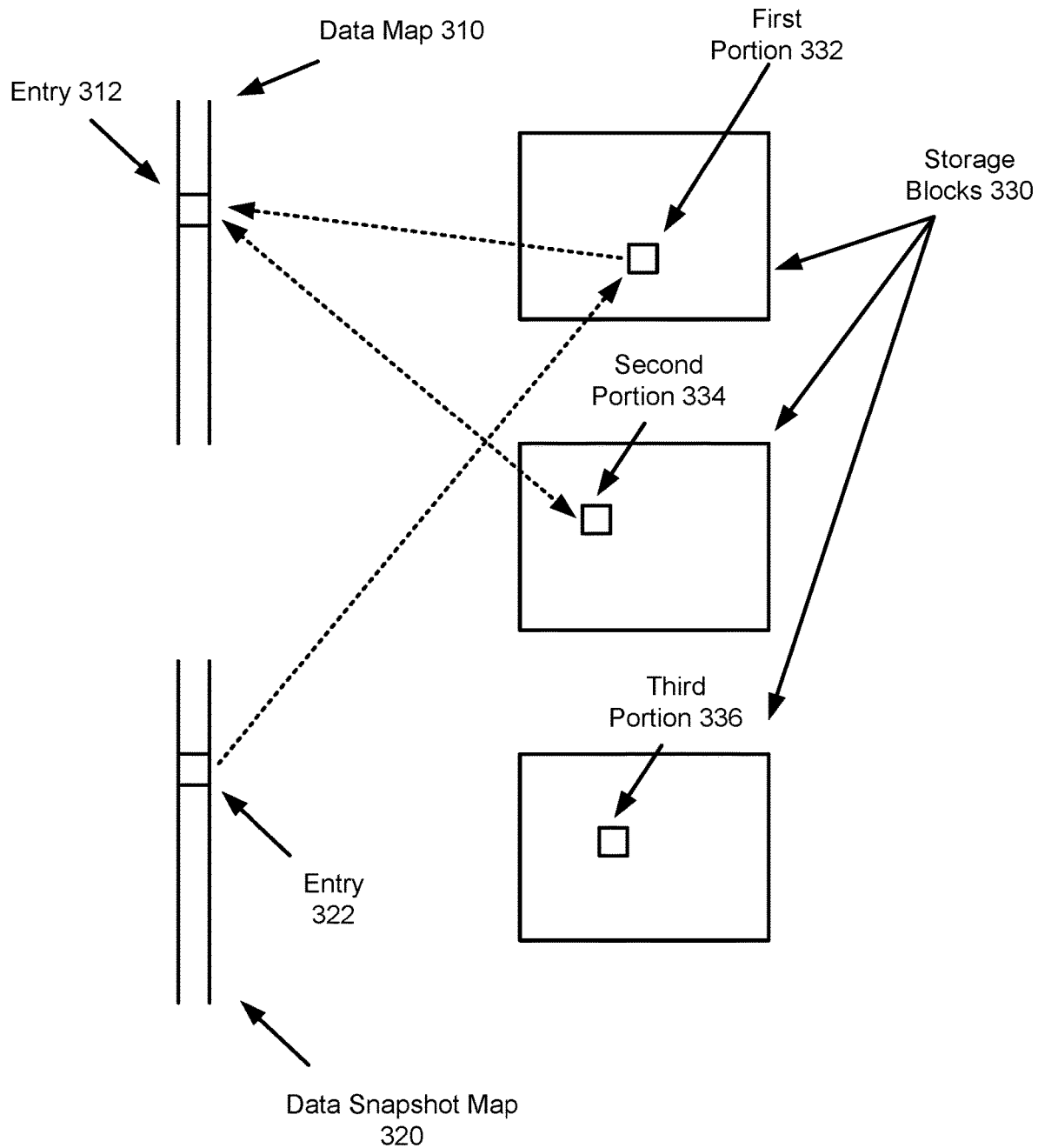
FIGS. 3H-3J show block diagrams illustrating garbage collection in accordance with an embodiment.
Figure 3I:
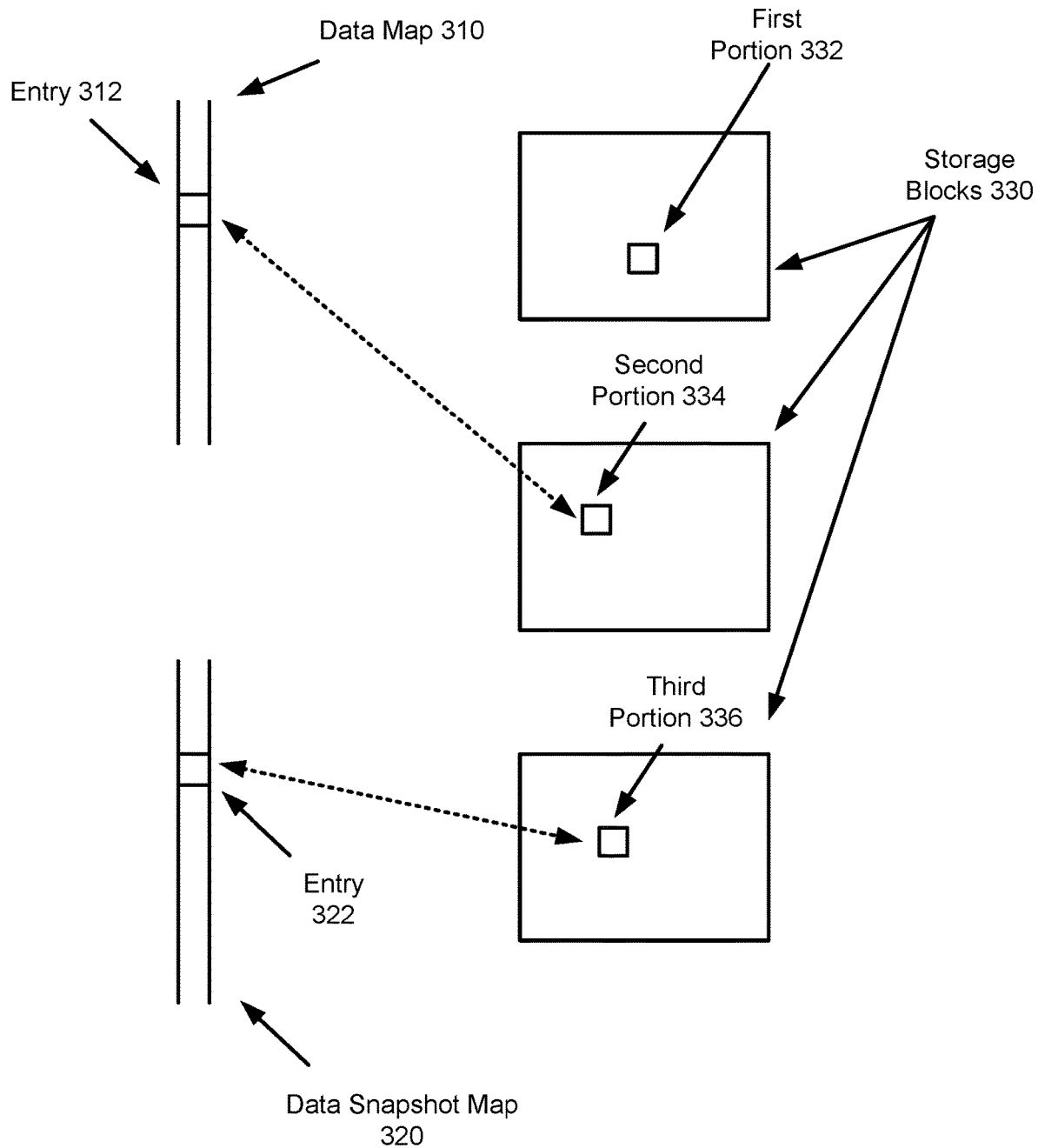
Figure 3J:
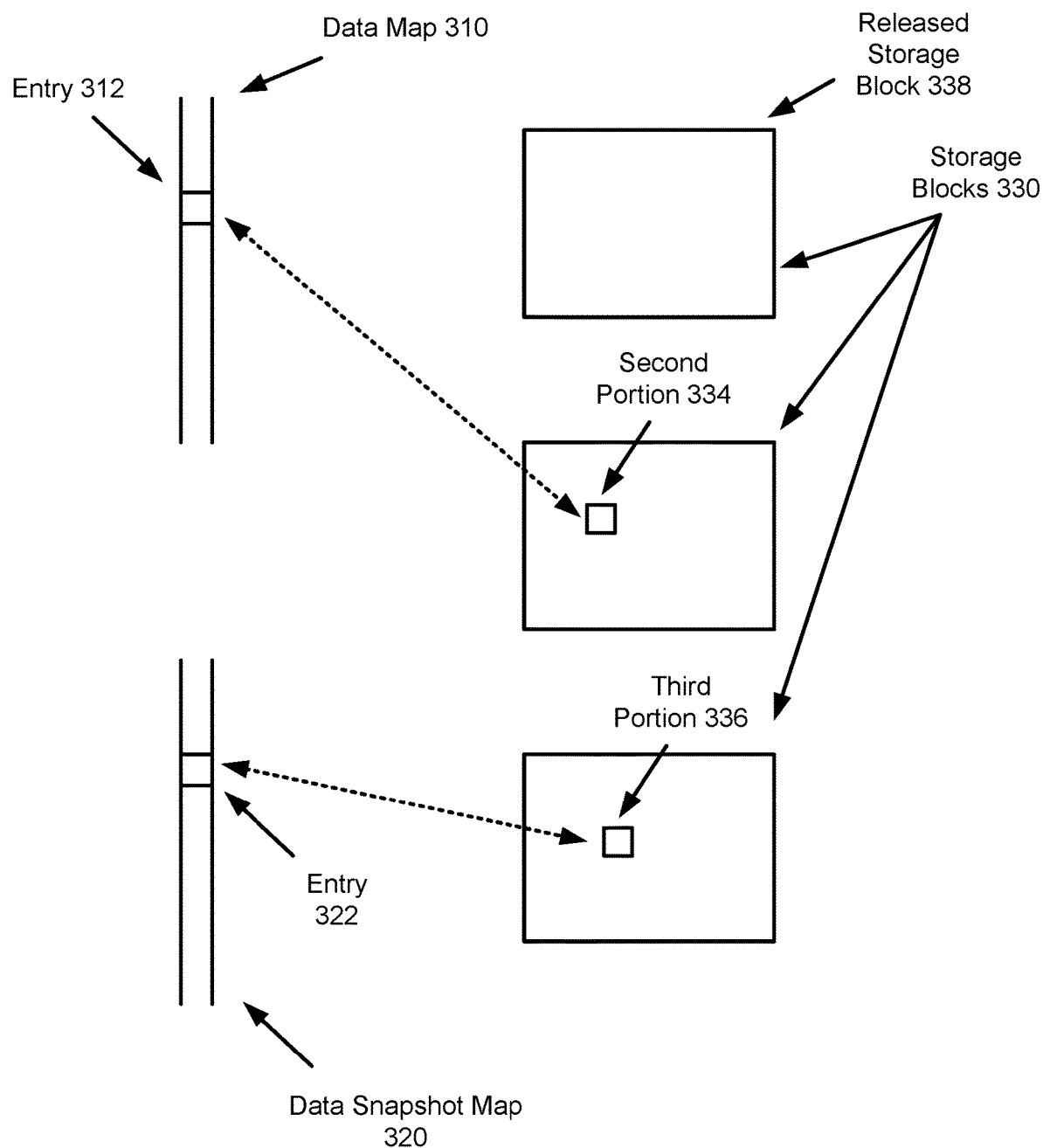

Turning to FIGS. 3H-3J, diagrams of indexing with a data map 310 and a data snapshot map 320 in accordance with an embodiment are shown. Consider a scenario where, following the description of FIG. 3F, a storage block of storage blocks 330 that includes first portion 332 is selected for garbage collection. Because the data in first portion 332 is not referenced by data map 310, but is referenced by data snapshot map 320, the data in first portion 332 is copied to third portion 336.

Turning to FIG. 3I, with the data copied to third portion 336 in a storage block that is both writable and not selected for garbage collection, entry 322 is updated. Because entry 322 directly referenced first portion 332, entry 322 is updated to directly reference third portion 336. By doing so, the data snapshot is maintained by ensuring that it is retrievable using data snapshot map 320 even while the storage block of storage blocks 330 that includes first portion 332 is garbage collected.

Turning to FIG. 3J, released storage block 338, that previously stored data in first portion 332, is released for reuse (e.g., reclaimed which may include erasing storage block 338). Once released for use, data may be written to first portion 332.

Turning to FIG. 4, a flow diagram illustrating a method of backing up a client in accordance with an embodiment is shown.

At operation 400, a backup generation request is obtained. As discussed above, the backup generation request may be obtained via any method without departing from embodiments disclosed herein. The backup generation request may indicate that a backup for a client is to be generated.

At operation 402, a snapshot for a point in time is generated. In an embodiment, the snapshot is generated via the method illustrated in FIG. 3A. Thus, the snapshot may not be a complete copy of data associated with the point in time. Rather, the snapshot may only include copies of data at the point in time that diverge from live data of the client. A data snapshot map may be generated for the snapshot.

At operation 404, a backup is generated with the snapshot. As discussed above, the backup may be generated with the snapshot by maintaining the snapshot during changes to the live data and garbage collection. Refer to FIGS. 3C and 3G for additional details regarding maintaining the snapshot while the backup is generated.

Once the backup is generated, the backup may be stored, for example, in a storage system (e.g., 110) for later use. After storage, the backup (or portions) and/or other backups (or portions) may be retrieved to restore data that has become inaccessible.

At operation 408, a data snapshot map associated with the snapshot is terminated. For example, after the backup is generated, the snapshot may no longer need to be maintained. To remove the snapshot, the data snapshot map may be deleted. By virtue of the data snapshot map being terminated (e.g., deleted), subsequently performed garbage collection may reclaim storage blocks used to store data for the snapshot that is not duplicative of live client data.

The method may end following operation 408

Figure 5:
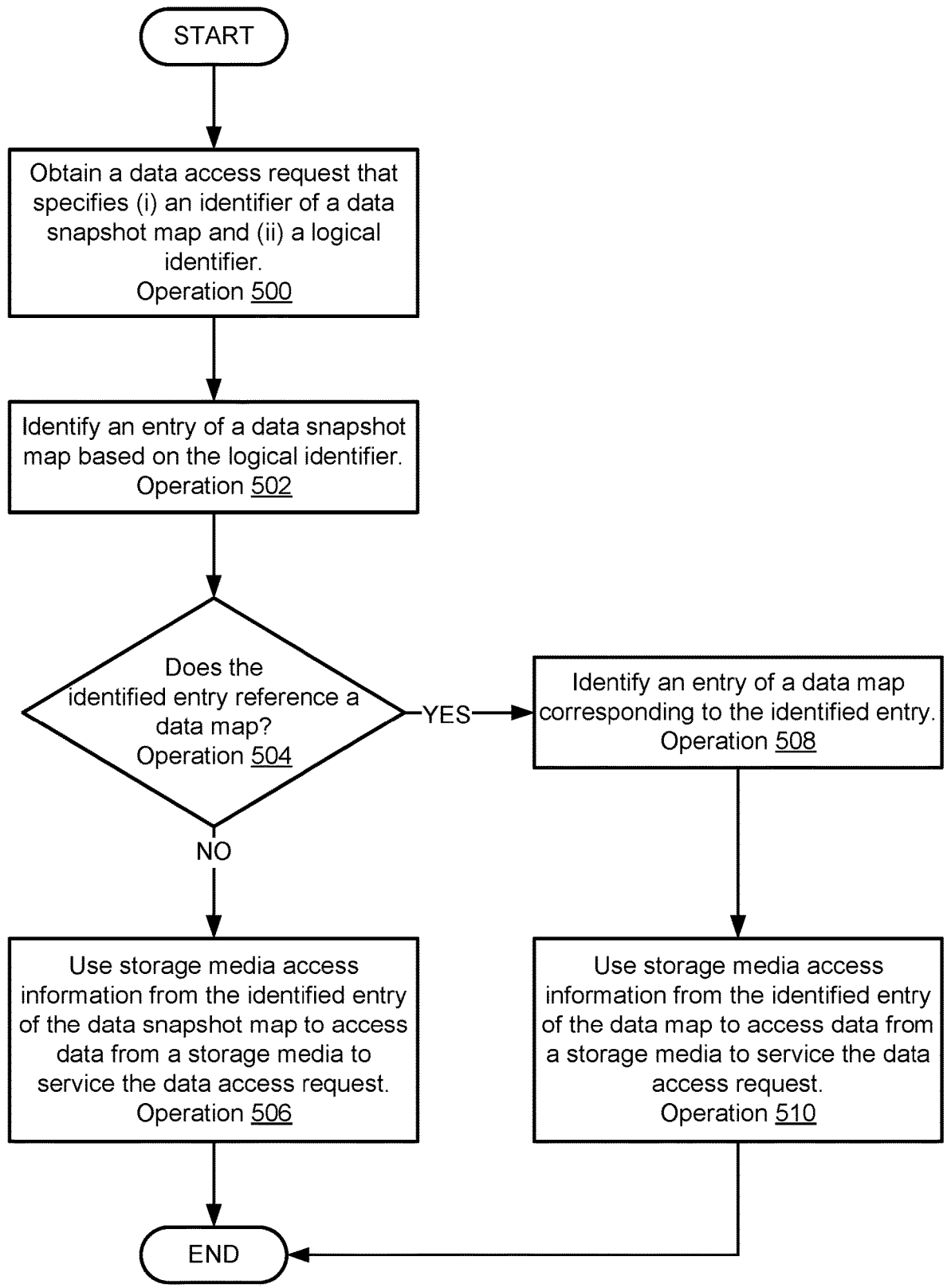
FIG. 5 shows a flow diagram illustrating a method of servicing a data access request in accordance with an embodiment.

Turning to FIG. 5, a flow diagram illustrating a method of servicing data access requests in accordance with an embodiment is shown.

At operation 500, a data access request is obtained. The data access request may specify (i) an identifier of a data snapshot map and (ii) a logical identifier. In other words, the data access request may request access to a portion of a snapshot stored in storage.

At operation 502, an entry of a data snapshot map is identified based on the logical identifier. To do so, the identifier of the data snapshot map may be used to determine that the data snapshot map should be used to service the data access request. Once so determined, the logical identifier may be used to identify the entry of the data snapshot map. For example, the logical identifier may include a logical block address, and the entry of the data snapshot map may include a copy of the logical block address thereby allowing from the entry to be identified by matching the logical block address from the data access request to the entry.

At operation 504, it is determined whether the identified entry references a data map. The determination may be made based on the entry. For example, the entry may either specify (i) storage media access information such as a physical address usable to access storage media or (ii) a reference to an entry of the data map.

The entry may include the reference to the data map when a portion of a snapshot is duplicative of a corresponding portion of live data. In contrast, the entry may include the storage media access information when a portion of the snapshot is not duplicative of the corresponding portion of live data.

In an embodiment, an entry of the data snapshot map is treated as referencing a corresponding entry of the data map without including an explicit reference. Rather, any entry of the data snapshot map that does not include storage media access info may be treated as reference a corresponding entry of the data map.

If it is determined that the identified entry of the snapshot data map references an entry of the data map, then the method may proceed to operation 508. Otherwise, the method may proceed to operation 506 following operation 504 when the identified entry of the data snapshot map does not reference any entry of the data map.

At operation 506, storage media access information from the identified entry of the data snapshot map is used to access data from storage media to service the data access request.

The method may end following operation 506.

Returning to operation 504, the method may proceed to operation 508 following operation 504 when it is determined that the identified entry of the data snapshot map references an entry of the data map.

At operation 508, an entry of the data map corresponding to the identified entry is identified. The entry of the data map may be identified based on a common organization scheme used by the data map and the snapshot data map. For example, the entry of the data snapshot map and the corresponding entry of the data map may be similarly indexed. Thus, when the entry of the data snapshot map is identified in operation 502, index information for the entry of the data snapshot map may be used to identify the corresponding entry of the data map.

At operation 510, storage media access information from the identified entry of the data map is used to access data from the storage media to service the data access request.

The method may end following operation 510

As seen and illustrated in FIGS. 3A-5, the disclosed methods and system may facilitate backup generation while reducing the number of writes for snapshots used for backup generation.

Figure 6:
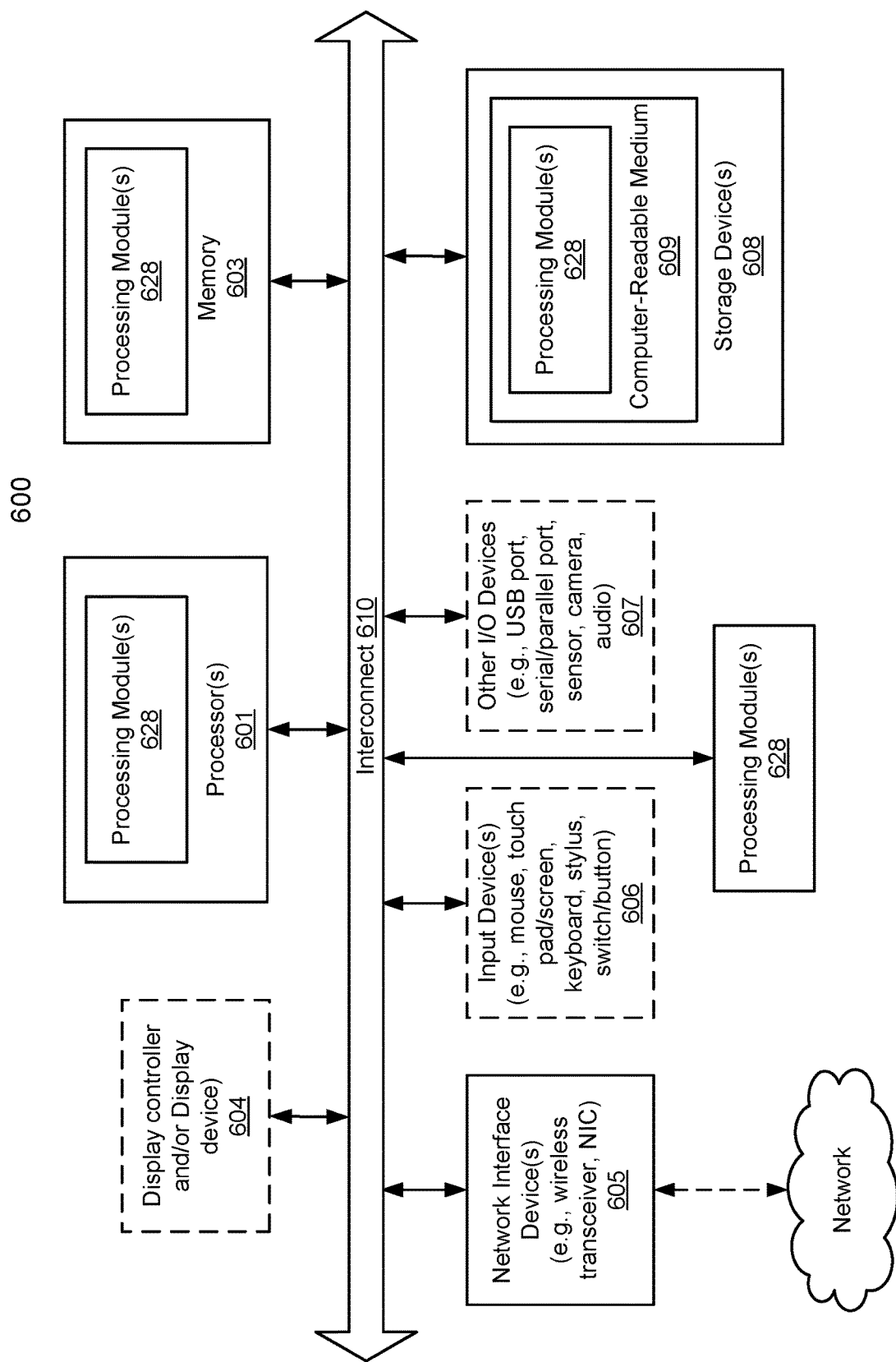
FIG. 6 is a block diagram illustrating a data processing system in accordance with an embodiment.

Any of the components illustrated in FIGS. 1-4 may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for operating a client, the method comprising:
   selecting a first storage block of a storage device for garbage collection;
   based on the selection of the first storage block, garbage collecting the first storage block by:
      making a first determination that a first portion of the first storage block is referenced by a data map, the data map comprising references usable to retrieve first data associated with a current point in time;
      in response to the first determination:
         storing a copy of a portion of the data from the first portion of the first storage block in a first portion of a second storage block of the storage device, and
         updating the data map based on the first portion of the second storage block, the updated data map indicating that the first portion of the first storage block does not store any first data;
      making a second determination that a second portion of the first storage block is referenced by a data snapshot map, the data snapshot map comprising references usable to retrieve second data associated with a past point in time; and
      in response to the second determination:
         storing a copy of a portion of the second data from the second portion of the first storage block in a first portion of a third storage block of the storage device, and
         updating the data snapshot map based on the first portion of the third storage block, the updated data snapshot map indicating that the second portion of the first storage block does not store any second data,
   wherein the first determination and the second determination are part of a live and dead data determination process associated with the garbage collection of the first storage block.

2. The computer-implemented method of claim 1, wherein updating the data map comprises:
   obtaining address information for the first portion of the second storage block;
   identifying an entry of the data map that specifies:
      an identifier for the portion of the first data, and
      address information for the first portion of the first storage block; and
   replacing, in the entry of the data map, the address information for the first portion of the first storage block with the address information for the first portion of the second storage block.

3. The computer-implemented method of claim 2, wherein storing the copy of the portion of the first data from the first portion of the first storage block in the first portion of the second storage block of the storage device comprises:
   writing the copy of the portion of the first data to the first portion of the second storage block using the address information for the first portion of the second storage block; and
   updating metadata associated with first portion of the second storage block to reference the entry.

4. The computer-implemented method of claim 2, wherein updating the data snapshot map comprises:
   obtaining address information for the first portion of the third storage block;
   identifying an entry of the data snapshot map that specifies:
      an identifier for the portion of the second data, and
      a reference to the entry of the data map; and
   replacing, in the entry of the data snapshot map, the reference to the entry of the data map with the address information for the first portion of the third storage block.

5. The computer-implemented method of claim 1, wherein updating the data snapshot map comprises:
   obtaining address information for the first portion of the third storage block;
   identifying an entry of the data snapshot map that specifies:
      an identifier for the portion of the second data, and
      address information for the second portion of the first storage block; and
   replacing, in the entry of the data snapshot map, the address information for the second portion of the first storage block with the address information for the first portion of the third storage block.

6. The computer-implemented method of claim 1, further comprising:
   releasing the first storage block in response to completing the garbage collection of the first storage block,
   wherein the live and dead data determination process is based on data maps comprising the data map and the data snapshot map.

7. The computer-implemented method of claim 1, further comprising:
obtaining a backup request for the client;
in response to obtaining the backup request:
generating the data snapshot map without storing any copies of the second data to service the backup request,
wherein the data snapshot map comprises entries that all reference entries of the data map when the data snapshot map is generated, and the second data is retained to complete a backup generation process.

8. The computer-implemented method of claim 1, wherein the storage device comprises a media that does not include write in place functionality.

9. The computer-implemented method of claim 6,
wherein the live and dead data determination process comprises determining that portions of the first storage block referenced by the data maps comprise live data while determining that portions of the first storage block not referenced by the data maps comprise dead data,
wherein the storage device is adapted to perform garbage collection to remove the dead data, and
wherein the garbage collection copies forward the live data from garbage collected blocks and releases the garbage collected blocks.

10. The computer-implemented method of claim 8, wherein the storage device is write limited.

11. A non-transitory machine-readable medium having instructions stored therein, which when executed by a processor, cause the processor to perform operations for operating a client, the operations comprising:
selecting a first storage block of a storage device for garbage collection;
based on the selection of the first storage block, garbage collecting the first storage block by:
making a first determination that a first portion of the first storage block is referenced by a data map, the data map comprising references usable to retrieve first data associated with a current point in time;
in response to the first determination:
storing a copy of a portion of the data from the first portion of the first storage block in a first portion of a second storage block of the storage device, and
updating the data map based on the first portion of the second storage block, the updated data map indicating that the first portion of the first storage block does not store any first data;
making a second determination that a second portion of the first storage block is referenced by a data snapshot map, the data snapshot map comprising references usable to retrieve second data associated with a past point in time; and
in response to the second determination:
storing a copy of a portion of the second data from the second portion of the first storage block in a first portion of a third storage block of the storage device, and
updating the data snapshot map based on the first portion of the third storage block, the updated data snapshot map indicating that the second portion of the first storage block does not store any second data,
wherein the first determination and the second determination are part of a live and dead data determination process associated with the garbage collection of the first storage block.

12. The non-transitory machine-readable medium of claim 11, wherein updating the data map comprises:
obtaining address information for the first portion of the second storage block;
identifying an entry of the data map that specifies:
an identifier for the portion of the first data, and
address information for the first portion of the first storage block; and
replacing, in the entry of the data map, the address information for the first portion of the first storage block with the address information for the first portion of the second storage block.

13. The non-transitory machine-readable medium of claim 12, wherein storing the copy of the portion of the first data from the first portion of the first storage block in the first portion of the second storage block of the storage device comprises:
writing the copy of the portion of the first data to the first portion of the second storage block using the address information for the first portion of the second storage block; and
updating metadata associated with first portion of the second storage block to reference the entry.

14. The non-transitory machine-readable medium of claim 12, wherein updating the data snapshot map comprises:
obtaining address information for the first portion of the third storage block;
identifying an entry of the data snapshot map that specifies:
an identifier for the portion of the second data, and
a reference to the entry of the data map; and
replacing, in the entry of the data snapshot map, the reference to the entry of the data map with the address information for the first portion of the third storage block.

15. The non-transitory machine-readable medium of claim 11, wherein updating the data snapshot map comprises:
obtaining address information for the first portion of the third storage block;
identifying an entry of the data snapshot map that specifies:
an identifier for the portion of the second data, and
address information for the second portion of the first storage block; and
replacing, in the entry of the data snapshot map, the address information for the second portion of the first storage block with the address information for the first portion of the third storage block.

16. A client, comprising:
a processor;
a storage device; and
a memory coupled to the processor to store instructions, which when executed by the processor, cause the processor to perform operations for operating the client, the operations comprising:
selecting a first storage block of the storage device for garbage collection;
based on the selection of the first storage block, garbage collecting the first storage block by:
making a first determination that a first portion of the first storage block is referenced by a data map, the data map comprising references usable to retrieve first data associated with a current point in time;

in response to the first determination:
  storing a copy of a portion of the data from the first portion of the first storage block in a first portion of a second storage block of the storage device, and
  updating the data map based on the first portion of the second storage block, the updated data map indicating that the first portion of the first storage block does not store any first data;

making a second determination that a second portion of the first storage block is referenced by a data snapshot map, the data snapshot map comprising references usable to retrieve second data associated with a past point in time; and in response to the second determination:
  storing a copy of a portion of the second data from the second portion of the first storage block in a first portion of a third storage block of the storage device, and
  updating the data snapshot map based on the first portion of the third storage block, the updated data snapshot map indicating that the second portion of the first storage block does not store any second data, wherein the first determination and the second determination are part of a live and dead data determination process associated with the garbage collection of the first storage block.

17. The client of claim 16, wherein updating the data map comprises:
  obtaining address information for the first portion of the second storage block;
  identifying an entry of the data map that specifies:
    an identifier for the portion of the first data, and
    address information for the first portion of the first storage block; and
  replacing, in the entry of the data map, the address information for the first portion of the first storage block with the address information for the first portion of the second storage block.

18. The client of claim 17, wherein storing the copy of the portion of the first data from the first portion of the first storage block in the first portion of the second storage block of the storage device comprises:
  writing the copy of the portion of the first data to the first portion of the second storage block using the address information for the first portion of the second storage block; and
  updating metadata associated with first portion of the second storage block to reference the entry.

19. The client of claim 17, wherein updating the data snapshot map comprises:
  obtaining address information for the first portion of the third storage block;
  identifying an entry of the data snapshot map that specifies:
    an identifier for the portion of the second data, and
    a reference to the entry of the data map; and
  replacing, in the entry of the data snapshot map, the reference to the entry of the data map with the address information for the first portion of the third storage block.

20. The client of claim 16, wherein updating the data snapshot map comprises:
  obtaining address information for the first portion of the third storage block;
  identifying an entry of the data snapshot map that specifies:
    an identifier for the portion of the second data, and
    address information for the second portion of the first storage block; and
  replacing, in the entry of the data snapshot map, the address information for the second portion of the first storage block with the address information for the first portion of the third storage block.

* * * * *